US011528922B2

(12) United States Patent
Beth Halachmi

(10) Patent No.: US 11,528,922 B2
(45) Date of Patent: Dec. 20, 2022

(54) SYSTEM, MACHINE AND METHOD FOR THE PREPARATION OF COOLED EDIBLE PRODUCTS

(71) Applicant: SOLO GELATO LTD., Hila (IL)

(72) Inventor: Barak Beth Halachmi, Hila (IL)

(73) Assignee: Solo Gelato Ltd., Hila (IL)

( * ) Notice: Subject to any disclaimer, the term of this patent is extended or adjusted under 35 U.S.C. 154(b) by 407 days.

(21) Appl. No.: 16/743,505

(22) Filed: Jan. 15, 2020

(65) Prior Publication Data

US 2020/0146311 A1 May 14, 2020

Related U.S. Application Data

(62) Division of application No. 14/911,323, filed as application No. PCT/IL2013/050691 on Aug. 14, 2013, now Pat. No. 10,595,544.

(51) Int. Cl.

| | |
|---|---|
| ***A23G 9/28*** | (2006.01) |
| ***A23G 9/30*** | (2006.01) |
| ***A23G 9/04*** | (2006.01) |
| ***A23G 9/22*** | (2006.01) |

(52) U.S. Cl.

CPC ............ *A23G 9/283* (2013.01); *A23G 9/045* (2013.01); *A23G 9/228* (2013.01); *A23G 9/28* (2013.01); *A23G 9/281* (2013.01); *A23G 9/282* (2013.01); *A23G 9/30* (2013.01)

(58) Field of Classification Search

CPC ........................................................ A23G 9/30

See application file for complete search history.

(56) References Cited

U.S. PATENT DOCUMENTS

| | | | |
|---|---|---|---|
| 3,858,498 A | | 1/1975 | Swenson |
| 4,632,566 A | | 12/1986 | Masel et al. |
| 4,755,060 A | | 7/1988 | Pedersen et al. |
| 4,848,381 A | * | 7/1989 | Livingston .............. B67D 1/07 141/90 |
| 5,027,698 A | | 7/1991 | Chirnomas |
| 5,069,364 A | | 12/1991 | McGill |
| 5,893,485 A | | 4/1999 | McGill |
| 5,967,023 A | | 10/1999 | Acknin et al. |
| 6,267,049 B1 | | 7/2001 | Silvano |
| 6,438,987 B1 | | 8/2002 | Pahl |
| 6,449,958 B1 | | 9/2002 | Foye |
| 6,490,872 B1 | | 12/2002 | Beck et al. |
| 6,672,097 B1 | | 1/2004 | Ashley |
| 7,254,490 B2 | | 8/2007 | Charlton |
| 9,357,874 B2 | | 6/2016 | Licare |
| 2002/0048621 A1 | | 4/2002 | Boyd et al. |
| 2003/0085237 A1 | | 5/2003 | Kateman et al. |
| 2004/0154316 A1 | | 8/2004 | Kateman |

(Continued)

FOREIGN PATENT DOCUMENTS

| | | |
|---|---|---|
| CN | 1483375 A | 3/2004 |
| EP | 0287194 A2 | 2/1988 |

(Continued)

*Primary Examiner* — John J Norton

(74) *Attorney, Agent, or Firm* — Browdy and Neimark, P.L.L.C.

(57) ABSTRACT

A system, machines and consumables for the preparation of portioned amount of a cooled edible product constituting a defined number of servings which may be 1, 2, 3, etc. are provided. One example of such an edible product is ice cream.

13 Claims, 26 Drawing Sheets

(56) References Cited

U.S. PATENT DOCUMENTS

| | | | |
|---|---|---|---|
| 2005/0103203 | A1 | 5/2005 | Takizawa |
| 2006/0137542 | A1 | 6/2006 | Bravo et al. |
| 2006/0150821 | A1 | 7/2006 | Paul et al. |
| 2007/0017382 | A1 | 1/2007 | Takizawa |
| 2010/0058772 | A1 | 3/2010 | Russo et al. |
| 2010/0239734 | A1 | 9/2010 | Yoakim et al. |
| 2010/0242497 | A1 | 9/2010 | Bertone |
| 2010/0263546 | A1 | 10/2010 | Leuzinger et al. |
| 2011/0020508 | A1 | 1/2011 | Santoiemmo |
| 2012/0096876 | A1 | 4/2012 | Ravji |
| 2012/0102972 | A1 | 5/2012 | Al-Qaffas |
| 2012/0199227 | A1 | 8/2012 | Manser et al. |
| 2012/0251677 | A1 | 10/2012 | Yoakim et al. |
| 2013/0095214 | A1 | 4/2013 | Ozanne et al. |
| 2013/0122157 | A1 | 5/2013 | Dogan et al. |
| 2014/0291426 | A1 | 10/2014 | Herbert |

FOREIGN PATENT DOCUMENTS

| | | | |
|---|---|---|---|
| EP | 1254603 | A2 | 4/2002 |
| EP | 1369069 | A | 10/2003 |
| EP | 1378176 | A2 | 1/2004 |
| EP | 2508080 | A1 | 10/2012 |
| JP | 2006-304602 | | 11/2006 |
| WO | 2006013362 | A1 | 2/2006 |
| WO | 2008068124 | A1 | 6/2008 |
| WO | 2010082185 | A1 | 7/2010 |
| WO | 2010/099806 | A1 | 9/2010 |
| WO | 2013121421 | A1 | 8/2013 |

* cited by examiner

SYSTEM, MACHINE AND METHOD FOR THE PREPARATION OF COOLED EDIBLE PRODUCTS

FIELD

This invention relates to systems, machines (particularly home use appliances), consumables and methods for preparing cooled edible products, in particular, ice creams, frozen yogurts, sorbets, milkshakes, smoothies etc.

BACKGROUND

In general, preparation of ice cream involves mixing of desired edible ingredients for forming a mixture, adding gas/air into the mixture (sometimes a by-product of the mixing itself) in order to soften the texture of the mixture and cooling of the mixture.

At present, the majority of ice creams are produced in an industrial process. In this process, ice cream is produced in large volumes and then separated into packages of various sizes and shipped and sold as such to the end users.

There are also known machines for domestic preparation of ice cream, allowing the user to prepare ice cream from a mixture of edible ingredients of his liking.

In principle, in such domestic ice cream machines, the user prepares a mix made of ingredients selected by him and introduces the mix into the machine which then cools the mix while mixing. Some machines have a built-in cooling arrangement while others only perform mixing, wherein the user is required to transfer the mix, or the machine itself, into the freezer (or any other cooling chamber).

GENERAL DESCRIPTION

Provided by the teaching of the present disclosure is a novel system, machine (e.g. an appliance including, but not limited, for home or office use) and consumables for preparing of cooled edible products from their ingredients, e.g. in a portioned amount constituting a defined number of servings which may be 1, 2, 3, etc. One example of such an edible product is ice cream. Other examples are frozen yogurt, sorbet, slush, smoothie, cooled desert products, gelatinous products, etc.

In accordance with embodiments of this disclosure, ingredients for production of the cooled edible product are contained in a receptacle (for example in the form of a pod or capsule), which is brought into association with a machine in a manner permitting content of the receptacle (which may be most, or at times the entire content of the receptacle) to be extracted by or fed into the machine (the term “extract” and any of its linguistic derivations, is meant to refer to any type of emptying of the receptacle or the transfer of its content to the machine for processing by it). The machine is then operated to produce the edible product. The content of the receptacle are transferred to a cooling chamber, prior or after mixing with a liquid (e.g. water, flavored water, milk, cream) where the final cooled edible product is formed.

The receptacle carries data that is indicative of process parameters to be applied by the machine to prepare said product. The data is formatted so as to permit reading by a data reader in the machine. The data may be embedded in an optically-readable data label, e.g. a barcode, or may be embedded in an electromagnetic element such as an RFID element. Once the receptacle is brought into association with the machine, the data carried by the receptacle is read by the data reader, and upon verification of said data, the content of the receptacle is emptied into the machine. Such data, once read, is fed into a controller of the machine that induces the machine to operate in a manner applying said process parameters to the processing of the edible ingredients to thereby obtain the cooled edible product.

It is to be noted that by some aspects of this disclosure, the use of a receptacle is optional.

By one embodiment, the code carried on the receptacle also serves to verify the authenticity of the receptacle and/or to verify that data was correctly deciphered.

The cooled edible product is a product that when consumed has a soft solid or semi-solid consistency, such as ice creams, frozen yogurts, sorbets, milkshakes, smoothies etc. By some embodiments of this disclosure the cooled edible product is dispensed through a dispensing outlet (e.g. a nozzle, a spout) which requires that the dispensed cooled edible product will have a viscosity such so as to permit its flwo out of such an outlet (e.g. will have some flowability).

There are a number of aspects to the present disclosure, which are improvements of the disclosure of the co-pending and co-owned PCT application serial number PCT/IL2013/050125, filed 11 Feb. 2013, the content of which being incorporated herein by reference for it pertinent parts.

One aspect of this disclosure concerns the extraction or emptying of the receptacles content (to be referred to herein, at times, as the “extraction aspect”); and a respective new receptacle design. Another aspect of this disclosure concerns a design of a cooling chamber (to be referred to as the “cooling chamber aspect”), that permits opening and detachment of some of its elements to facilitate cleaning. A further aspect concerns a rinsing assembly that permits rinsing of its elements that come into contact with the edible ingredients and the finished cooled food product without having to link it to a drainage system (to be referred to as the “rinsing aspect”). It is to be noted that provided for each of these aspects is a system, method, machine and consumables (which are the ingredient-comprising receptacles).

For better understanding of the subject of this disclosure and to ensure completeness of the description, provided below is a general description based on that in said co-pending PCT application followed by a description of each of the aspects of this disclosure. In the text below, even when included within the description pertaining to said PCT application, the term “this disclosure” refers to the novel features disclosed and claimed for the first time herein.

The System, Method, Machine and Consumables of PCT/IL2013/050125

The system disclosed there for the preparation of a cooled edible product from ingredients comprises a receptacle holding at least some of the ingredients, and a processor, that comprises or is associated with a data reader, for processing the ingredients and producing the cooled edible product therefrom. The receptacle is configured for association with the processor in a manner permitting the majority of the content of the receptacle to be extracted by the processor. The receptacle carries data indicative of process parameters specific for said processing. The data is formatted in a manner that permits its identification by the data reader to thereby induce the processor to apply said process parameters to said processing. The processing arrangement of said machine can comprise a mixing chamber configured for mixing the edible ingredients contained within the receptacle to form a pre-cooled mixture. In particular, the mixing chamber can be configured for receiving therein at least one additional ingredient from a source other than the receptacle.

The processing arrangement can also comprise an aeration arrangement configured for introducing gas into a given mixture to form an aerated mixture, and a cooling arrangement configured for reducing the temperature of a mixture contained therein to provide a cooled mixture. However, it is appreciated that the aeration of the mixture can also be performed as part of the mixing process in the mixing chamber, i.e. by mixing the ingredients, the mix is naturally aerated.

The cooling arrangement may comprise a cooling chamber adapted for receiving the mixed ingredients and holding them for a time sufficient for them to cool. The cooling chamber may also, by one embodiment, serve as a mixing chamber and be provided with at least one rotating element configured for agitating, shearing and/or mixing the ingredients during cooling, as well as scraping off material from the inner walls of this combined cooling and mixing chamber.

The rotating element can be constituted by, for example, a dasher, an auger and/or a combination thereof. Respectively, the ingress and egress directions of material into and out of the cooling chamber can vary. For example, in case of an auger, the ingredients ingress into the cooling chamber at one end of a longitudinal axis of the auger, be progressed therealong and discharged at the other end. By another embodiment, the cooling chamber or a combined cooling and mixing chamber, has a single opening serving for both ingress of the ingredients and egress of the cooled edible product.

The machine may also be provided with a defrosting arrangement disposed between the mixing chamber and the cooling chamber, and configured for preventing the passageway between the chambers from being clogged due to freezing (as one side of the passageway is opened to the cooling chamber). By a particular example, the defrosting arrangement can comprise a heat source associated with the passageway and configured for heating thereof.

In addition, the machine can also comprise a discharge arrangement configured for evacuating any residual material contained in the passageway between the mixing chamber and the cooling chamber, during or following the production of the cooled edible product. This can allow the machine to operate continuously without requiring any disassembling thereof between production sequences.

In addition, the machine can be configured so as not to begin a new production sequence before the passageway between the mixing chamber and the cooling chamber is properly cleared of the cooled edible product prepared during a previous sequence.

The machine may be formed with an outlet configured for dispensing the cooled edible product. The outlet may be adapted to receive and hold a patterning element, configured for providing the edible product discharged through the outlet opening with a particular shape and/or pattern. In particular, a patterning element can be in the form of a perforated disc, so that when the edible product is pressed through the perforation(s) it assumes a cross-sectional shape which is that of the perforation(s).

The process parameters can be any parameter of an operation constituting part of the preparation of the cooled edible product and affecting its final characteristics. For example, the process parameters can be at least one of the following:

mixing time of the at least one ingredient;
quantity of an additional ingredient;
introduction time of an additional ingredient;
aeration time of a mixture of the at least one ingredient;
amount of gas introduced into a mixture of the at least one ingredient during its aeration time;
cooling time of an aerated mixture of the at least one ingredient;
revolution velocity of the dasher of the cooling chamber,
temperature reduction of an aerated mixture of the at least one ingredient;
pressure within the mixing and cooling chambers;
diameter of an outlet through which said edible product is provided;
provision rate of said edible product through an outlet;
size of the valve opening between the mixing chamber and the cooling chamber;
opening frequency/time of the valve opening between the mixing chamber and the cooling chamber.

The arrangement can be such that said process parameters are configured for determining processing of the at least one edible ingredients after its extraction from said receptacle. In other words, the process parameters relate to all steps of preparation of the cooled edible products, not only operations taking place within the receptacle.

The controller can also be configured for controlling the valve opening between the mixing chamber and the cooling chamber, for example, for providing a gradually increasing/decreasing opening diameter thereof. Such control may allow optimizing the preparation process of the cooled edible product. In addition, the controller can be configured for regulating operation of the dasher of the mixing chamber, e.g. by providing a variable revolution speed during the preparation process depending on various stages. The controller can also be programmed to alert the user regarding required cleaning of the machine and to prevent use of the machine if such cleaning is not performed. This can happen under various circumstances, non-limiting examples of which are: a predetermined amount of time has passed without proper cleaning of the machine; residual ingredients are left within the machine, in particular within the passageway leading from the mixing chamber to the cooling chamber, the controller does not receive an indication regarding parameters pointing to a successful emptying of the cooled edible product from the machine at the end of a previous manufacturing sequence; or different types of cooled edible products are attempted to be prepared successively, e.g. sorbet following yogurt. In all of the above cases, the controller can prevent the machine from preparing the cooled edible product and alert the user that a cleaning process should be performed before performing another preparation sequence.

The controller can be programmed to monitor different parameters of operation of the machine, for example, the last time of use, type of edible products prepared etc. The controller can also be fitted with a memory unit for storing the required data and providing statistics based thereon.

In addition, the controller can be provided with the ability to download data for maintenance purposes, for example, firmware updates from the manufacturer website.

The process parameters may also include other elements such as, for example, configuring the machine so that unless mixing was properly performed and accomplished and/or unless the outlet opening was properly opened for a predetermined amount of time, the machine will not allow use of another receptacle. Another example is a control of the revolution speed of the mixing element upon discharge of the edible product from the machine, as well as the amount of time in which the outlet is opened for such discharge.

Typically, the operation of the machine is configured to (i) prevent mixing of ingredients from different receptacles, and (ii) substantially emptying ingredients from a different run of the machine before a new run.

The receptacles, which may be in the form of pods or capsules, may have a variety of configurations. The receptacle contains at least one edible ingredient for the preparation of a cooled edible product by applying process parameters, and carries data indicative of the process parameters, that is readable by a data reader of a processor of the machine to thereby induce the machine to impart said process parameters.

The machine can further be configured for the provision of at least one additional edible ingredient into said mixing chamber to be mixed with the at least one ingredient extracted from said receptacle.

The machine can be configured for simultaneously receiving therein more than one receptacle, for producing cooled edible products from a mixture of ingredients extracted from the more than one receptacle. In such a machine, corresponding more than one readers may be included for simultaneous reading of data from the respective receptacles. The controller can be configured for integrating the data received from various pods in order to determine the process parameters for preparation of the edible product from the different pods.

Furthermore, according to a particular example, the machine can be formed with different ports, each being configured for receiving therein pods of different designs, each pod carrying a different set of ingredients and configured for contributing to the production of the cooled edible product. Some combinations permitted by such a design include:

- a first pod containing edible ingredients and a second pod containing fluids. For example, the first pod can contain the ingredients for producing chocolate ice cream (e.g. sugar, cocoa and functional ingredients) while the second pod can contain a flavored fluid (e.g. orange juice), thereby producing orange flavored chocolate ice cream;
- a first pod containing edible ingredients and a second pod containing a topping of some sort. e.g. sprinkles, chocolate chips etc.;
- several pods containing different ingredients for producing an enlarged dose of ice cream having a mixed flavor; and
- a plurality of pods, each containing ingredients for the production of the edible product, allowing successively producing of consecutive portions of the edible product without re-charging the machine with a pod after every batch.

In general, the machine can be provided with a data reader, a controller and a drive motor, such that the data reader is configured for obtaining the data provided on the receptacle and transfer it to the controller, and the controller is configured for using this data for controlling the operation of the drive motor operating the various arrangements of the machine.

It is also appreciated that the controller can be configured for controlling any other of the machine's components and functions, e.g. the cooling chamber, provision of fluids, operation of the valve/s etc.

The data reader of said machine and the data provided on said receptacle can be, for example, at least one of the following: a barcode scanner and a barcode; an RFID reader and an RFID tag; an optical scanner and a graphic pattern; a magnetic strip and a magnetic reader; depressible elements and a pattern of bulges for depressing said depressible elements.

The controller can also be responsible for handling malfunctions and tech-support of the machine. In particular, in the event of a malfunction, the controller can be configured to output a malfunction code which can be provided to a service company.

The malfunction code can either be provided to the company by the user or automatically by the machine, allowing the service company to form a record regarding repeating malfunctions etc.

Furthermore, the data transferred between the pod and the controller can also comprise authentication information regarding the pod (e.g. indication of a genuine pod or a 'third party' pod). Authentication can be performed, for example, by a serial number associated with the pod, optionally including some mathematical algorithm applied to the serial number. This also facilitates preventing re-use of the same poxd and/or serial number/code twice within the same machine.

In addition, the data can also include information regarding the expiration date of the ingredients within the pod, preventing the use of pods, the date of ingredients of which has already expired. This feature can also be particularly useful for facilitating constant replacement of series of receptacles and complementary authentication codes thereby preventing a third party from using the authentication codes of old receptacle series (not sold anymore on the market).

In addition, the machine can also comprise a mechanism configured for deforming the used receptacle/pod/capsule after use thereof, e.g. crushing or compressing it. Such a mechanism may allow for a more compact waste volume of the used capsules as well as for preventing re-use of the pod itself.

In accordance with a particular design of the above described system, it can furthermore comprise a complementary cooling arrangement configured for accelerating the cooling process taking place in the cooling chamber. In particular, the complementary cooling arrangement can be provided with a cooling mass or substance at below-zero temperature configured for either mixing with the ingredients of the receptacle within the mixing chamber and/or cooling chamber or coming into contact with an external surface of the mixing chamber and/or cooling chamber in order to facilitate cooling. The cooling mass can be a crushed or flaked solid (e.g. $CO_2$ in solid form at about 80° C. below zero), a fluid (e.g. liquid Nitrogen at 180° C. below zero, liquid Oxygen at 220° C. below zero) or even a gas.

According to one example, the cooling arrangement can comprise a cooling port configured for receiving therein a pod containing a pre-determined amount of cooling fluid, commensurate to the portioned amount of cooled edible product to be prepared using the machine. However, it is appreciated that the cooling arrangement can alternatively comprise a receptacle configured for containing the cooling fluid and distributing a required amount of cooling fluid during the manufacturing process of the cooled edible product.

The complementary cooling arrangement provides the option for expedited preparation (also referred herein a 'turbo mode') of the cooled edible product, requiring considerably less time than when using the cooling chamber in its own.

A machine or appliance for the preparation of a cooled edible product comprises a processor for processing the ingredients and producing the cooled edible product therefrom. The processor comprises or is associated with a data reader. The machine is configured for association with a receptacle of the kind described herein that contains one or more of the edible ingredients to be processed and carries data indicative of process parameters specific for said processing. The data is formatted in a manner permitting its identification by the data reader to thereby induce the processor to apply said process parameters to said processing. The machine can further be configured for receiving a cleaning receptacle containing at least one cleaning agent and for the initiation of a cleaning sequence for cleaning the appliance. The cleaning receptacle contains cleaning agents and typically carries a data unit indicative of process parameters to be applied by the appliance for cleaning. (It is to be noted that according to the cleaning aspect of this disclosure, as will be elaborated below, an alternative cleansing arrangement, which may be used in addition or in the alternative to the use of such cleaning receptacle, is provided). In particular, the cleaning receptacle can comprise a data unit containing data associated with predetermined process parameters for the cleaning of the appliance. However, it should also be appreciated that a cleaning receptacle can be provided with data indicative of process parameters which are unique for a cleaning process and differ from the process parameters required for the preparation of cooled edible products. The machine can be configured to use the cleaning receptacle in order to rinse some of its elements, e.g. mixing chamber, cooling chamber etc. The fluid used for rinsing the components can be discharged from the appliance to the outside environment (for example into an external receptacle). Alternatively, the appliance can be configured with proper conduits allowing the discharge of rinsing fluids directly into a drainage system (for example to a drain pipe of a sink). (It is to be noted that according to the cleaning aspect of this disclosure, an alternative cleaning arrangement, which does not require link to a drainage system, is provided).

In addition, the appliance can comprise a rinsing arrangement configured for providing the appliance with heated rinsing fluid during a cleaning process using the cleaning receptacle. According to one example, the rinsing arrangement can be configured for connection to a water supply network external to the appliance.

Alternatively, according to another example, the rinsing arrangement can comprise as a rinsing chamber containing therein rinsing fluid and means for heating thereof prior to its provision to the appliance.

It is noted that the rinsing fluid does not have to include any detergents or cleaning agents and can simply be constituted by water. As previously described, the appliance can be configured for receiving therein a cleaning receptacle containing the required detergents and configured for operating in conjunction with the rinsing fluid.

The rinsing arrangement can also comprise at least one cleaning nozzle configured for providing a directional jet of rinsing fluid to various components of the appliance, for example, the valve between the mixing chamber and the cooling chamber, and the outlet opening in order to rinse therefrom any residual ingredients or leftovers of the cooled edible product.

This Disclosure

This disclosure, as already noted above, has 3 aspects each of which will now be described. Each of the aspects of this disclosure includes a system, machine and receptacle. The aspects of this disclosure may be used for the preparation of a wide variety of cooled edible products, particularly such which are viscous liquid, or have a semi solid or semi gelatinous consistency. A particular example is ice cream. Like the case of the disclosure of PCT/IL2013/050125, this disclosure applies in particular (but not limited) to the preparation of portioned amounts of the cooled edible product, e.g. a single serving, 2 servings or sometimes more. As can be seen from the disclosure below, one of the aspects requires the use of capsule, which may be of the kind carrying data on the processor parameters to be applied (e.g. of the kind disclosed in said PCT application and also incorporated herein) and in the other two aspects this is optional. In the case of the use of such a receptacle, the eventual portioned amount will typically be that of a single serving.

Each of these aspects may be combined with respective machine, system, receptacle and method implementations of the disclosure in PCT/IL2013/050125 as well as with one another. All such combinations are part of this disclosure.

The Extraction Aspect

The system comprises a receptacle that holds at least some of the ingredients, and a processor for processing the ingredients together with a liquid to produce the cooled edible product therefrom. The receptacle, by one embodiment carries data indicative of process parameters specific for said processing, the data being formatted in a manner permitting its identification by a data reader utility associated with the processor to thereby induce the processor to apply said process parameters to said ingredients during said processing. The processor comprises or is associated with a cooling arrangement and an adapter module. The data reader utility, if present, is configured for reading said data and the association with the processor permits to thereby induce the processor to apply said process parameters. The adapter module comprises a liquid conduit portion permitting flow of the liquid therethrough and being in a liquid flow path between a source and the processor, is configured for receiving and holding said receptacle such that the opening of the receptacle comes to be in association with said conduit, whereby the flow of liquid through said conduit causes the ingredients to be extracted out from the receptacle and to be carried by the liquid to the processor.

The machine of this aspect, similar to the system, comprises a processor for processing the ingredients together with a liquid and producing the cooled edible product therefrom. The processor is associated with an adapter module. The processor may, by some embodiments, be also associated with a data reader utility. The data reader, if present, utility is configured for reading data carried on said receptacle to thereby induce the processor to apply said process parameters to said ingredients during said processing. The adapter module comprises a liquid conduit portion permitting flow of the liquid therethrough and being in a liquid flow path between a source and the processor, is configured for receiving and holding said receptacle such that the opening of the receptacle comes to be in association with said conduit, whereby the flow of liquid through said conduit causes the ingredients to be extracted out from the receptacle and to be carried by the liquid to the processor. The machine also comprises a dispensing outlet for dispensing the cooled edible product.

By one embodiment, the data reader is configured for reading said data while the receptacle is held within said adapter module. Said data reader may be comprised within said adapter module or may be external to said module, e.g. positioned so as to read data carried on portions of the receptacle that may be left exposed while the receptacle is held within the adapter.

The liquid conduit may be defined between an inlet linked to a liquid supply and an outlet linked to the processor.

The adapter may have a body defined between two ends and that may include an opening. e.g. a side opening, for insertion of a receptacle. The adapter may comprise said conduit at one of the two ends and comprises a piston arrangement at its other end. This arrangement includes a piston that can reciprocate between a retracted state, in which the receptacle can be introduced into the adapter and an extended state, in which the content of receptacle can be introduced into said conduit. The movement of the piston towards the extended state may, by one embodiment, also induce the extraction of the content of the receptacle into said conduit. This movement of the piston may also, by another embodiment, induce the opening of the receptacle.

The receptacle may carry data indicative of process parameters specific for said processing, the data being formatted in a manner permitting its identification by the data reader to thereby induce the processor to apply said process parameters to said processing.

The receptacle may be in the form of a capsule or pod.

The machine typically comprises a pump for drawing liquid from a source (which may be a liquid container, tap water, etc.) to and propelling it to and through said conduit.

The Cooling Chamber Aspect

The system of this aspect for the preparation of a cooled edible product comprises a receptacle holding at least some of the ingredients and a processor for processing the ingredients (e.g. together with a liquid) to produce the cooled edible product therefrom. The receptacle, by some embodiments, carries data indicative of process parameters specific for said processing, the data being formatted in a manner permitting its reading by a data reader utility that may be associated with the processor. The processor comprises or is associated with an adapter module for linking the receptacle with the processor to permit extraction of the ingredients therefrom and their transfer to the processor. The data reader utility, if present, is also comprised or associated with the processor and serves for reading the data on the receptacle to thereby induce the processor to apply said process parameters to said ingredients during said processing. A cooling chamber is comprised in the processor and is adapted for receiving and cooling the ingredients and the liquid. Disposed within the chamber is a mixing element, e.g. a dasher that is configured for mixing the ingredients and the liquid while being cooled within the chamber. The dasher also allows for continuous scraping of the cooling chamber's internal walls in order to remove frozen or solidified ingredients from the walls. The cooling chamber also comprises a wall element that may be detached or opened to permit access to the chamber's interior for cleaning or maintenance.

The machine of this aspect comprises a processor for processing the ingredients to produce the cooled edible product therefrom. The processor comprises or is associated with an adapter module and comprises a cooling arrangement. By some embodiments the processor may be associated with a data reader utility. The adapter module is configured for engagement with a receptacle that holds at least some of the ingredients. The receptacle, by some embodiments, may also carry data formatted in a manner permitting its reading by the data reader utility and is indicative of process parameters specific for said processing. The data reader utility, if present, is configured for reading the data on the receptacle to thereby induce the processor to apply said process parameters to said ingredients during said processing. The cooling arrangement comprises a cooling chamber that comprises a mixing (typically rotational) element, e.g. a dasher that is disposed within the chamber and that also permits continuous scraping of the cooling chamber's internal walls in order to remove frozen or solidified ingredients from the walls. The mixing element is configured for mixing the ingredients and the liquid while being cooled within in the chamber, and comprises a wall element that may be detached or opened to permit access to the chamber's interior for cleaning or maintenance. The machine also comprises a dispensing outlet for dispensing the formed cooled edible product.

The chamber has typically a general cylindrical shape with two opposite bases and defining an axis (the cylinder's axis). The mixing element, e.g. dasher, is typically configured such that it rotates about said axis. It is of note that the dasher itself may also be easily removed from the cooling chamber, thereby facilitating its cleaning by the user.

The wall element that may be detached or opened is typically at one of the two bases. Said wall element may be configured as a detachable element defining substantially an entire base of the cooling chamber. Said wall element may be attached to the chamber through a rotational engagement mechanism, through the use of latches, fasteners or other types of engagement means.

The Rinsing Aspect

A system for the preparation of a cooled edible product from ingredients of this aspect comprises a processor with a cooling arrangement for processing the ingredients to produce the cooled edible product therefrom; and a rinsing utility for association with the processor. The rinsing utility comprises a rinsing liquid chamber (the rinsing liquid being, for example, water, detergent, diluted detergent, a disinfectant, etc.) associate with a pump that can draw the rinsing liquid and propel it through rinsing conduit system, and comprises a drainage chamber for collecting liquid during the rinsing operational mode that is in liquid communication with a drainage outlet of the processor.

The machine of this aspect has at least two operative modes, at least one of which being a product preparation mode and at least one other being a rinsing operational mode. The machine comprises a processor operative in the product preparation mode for processing the ingredients to produce the cooled edible product therefrom; and a rinsing utility that may be associated with the processor and operative in the rinsing operational mode. The rinsing utility has the characteristics defined above. The machine also comprises a dispensing outlet for dispensing the formed cooled edible product.

During the product preparation operational mode the rinsing utility may be disassociated from the processor or the machine and may be associated only in (or prior to) the rinsing operational mode.

The rinsing utility may be associated with the processor such that a dispensing outlet of the processor is fitted in a manner permitting liquid egressing therefrom to drain directly into the drainage chamber. By one example, the drainage chamber has an opening and the dispensing outlet fits into or is positioned above said opening.

The machine has a front facing a user and the rinsing utility may, by one embodiment, be associated with the machine through its front.

The machine or the system may comprise or be associated with an adapter module for linking a receptacle holding at least some of the ingredient with the processor to permit extraction of the ingredients therefrom and their transfer to the processor. The machine may comprise or the processor may be associated with a data reader utility, in which case the receptacle carries data indicative of process parameters specific for said processing, the data being formatted in a manner permitting its identification by the data reader utility to thereby induce the processor to apply said process parameters to said ingredients during said processing. The data reader utility is, thus, configured for reading said data and the association with the processor permits to thereby induce the processor to apply said process parameters.

By one embodiment the machine comprises a pump. By another embodiment a pump included in the machine and that is operative in the product preparation operational mode for propelling liquid to the processor, is also configured for drawing, in the rinsing operational mode, the rinsing liquid out of the rinsing liquid chamber.

BRIEF DESCRIPTION OF THE DRAWINGS

In order to understand the invention and to see how it may be carried out in practice, embodiments will now be described, by way of non-limiting example only, with reference to the accompanying drawings. FIGS. 1-22 describe embodiments of the system, method, machine and consumables of PCT Application Serial No. PCT/IL2013/050125. These embodiments may be of relevance to this disclosure as they may be combined with embodiments of the new aspects disclosed herein.

FIGS. 23 to 30 relate to embodiments of the different aspects of this disclosure which, in this described example, are all incorporated in a single machine.

In the drawings:

FIG. 1 is a schematic cross-sectional view of a machine according to said PCT application;

FIG. 2 is a schematic enlarged view of detail A shown in FIG. 1;

FIG. 3 is a schematic cross-sectional view of a pod used in the machine shown in FIGS. 1 and 2;

FIGS. 4 and 5 are schematic cross-sectional views of two variations of the pod shown in FIG. 3;

FIG. 6 is a schematic cross-sectional view of a variation of the machine shown in FIG. 1, demonstrating insertion of a pod therein;

FIG. 7 is a schematic cross-sectional view of another modification of the machine shown in FIG. 1;

FIGS. 8 and 9 are schematic cross-sectional views showing a possible opening configuration of an outlet port of the machine shown in FIG. 1;

FIGS. 10 and 11 are schematic cross-sectional views showing another example of a possible opening configuration of an outlet port of the machine shown in FIG. 1;

FIGS. 12 and 13 are schematic cross-sectional illustrations of examples of orientation of a cooling chamber of the machine shown in FIG. 1;

FIG. 16 is a schematic front view of a dry pod according to another example of said PCT application;

FIG. 17 is a schematic diagram of a temperature regulating module according to the disclosed subject matter of the present application;

FIG. 22 is a schematic isometric view of a pod used in the machine shown in FIGS. 21A to 21E;

FIG. 23 shows a side elevation of the internal elements of a machine according to an embodiment of this disclosure in a product preparation operational mode of the machine;

FIG. 24 illustrates, in isolation, the adapter module and cooling chamber being drawn in manner permitting to visualize some of their internal elements;

FIG. 26 shows a perspective view from the direction of arrow X of FIG. 24;

FIG. 27 shows the elements of the cooling chamber open for cleaning and its elements being spread;

FIG. 28 shows the machine of FIG. 1 in a rinsing mode with a rinsing utility associated with the machine;

FIG. 29 is a perspective view of the rinsing utility; and

FIG. 30 is a cross-sectional view of the rinsing utility, along the plane defined by arrows Y-Y of FIG. 29.

DETAILED DESCRIPTION OF EMBODIMENTS

The first part of the following description relates to specific embodiments of PCT/IL2013/050125. Some of their elements are relevant for or may be combined with one or more of the aspects of this disclosure, embodiments of which are described in the second part of the following description.

Disclosure of Embodiments of PCT/IL2013/050125

Figure 1:
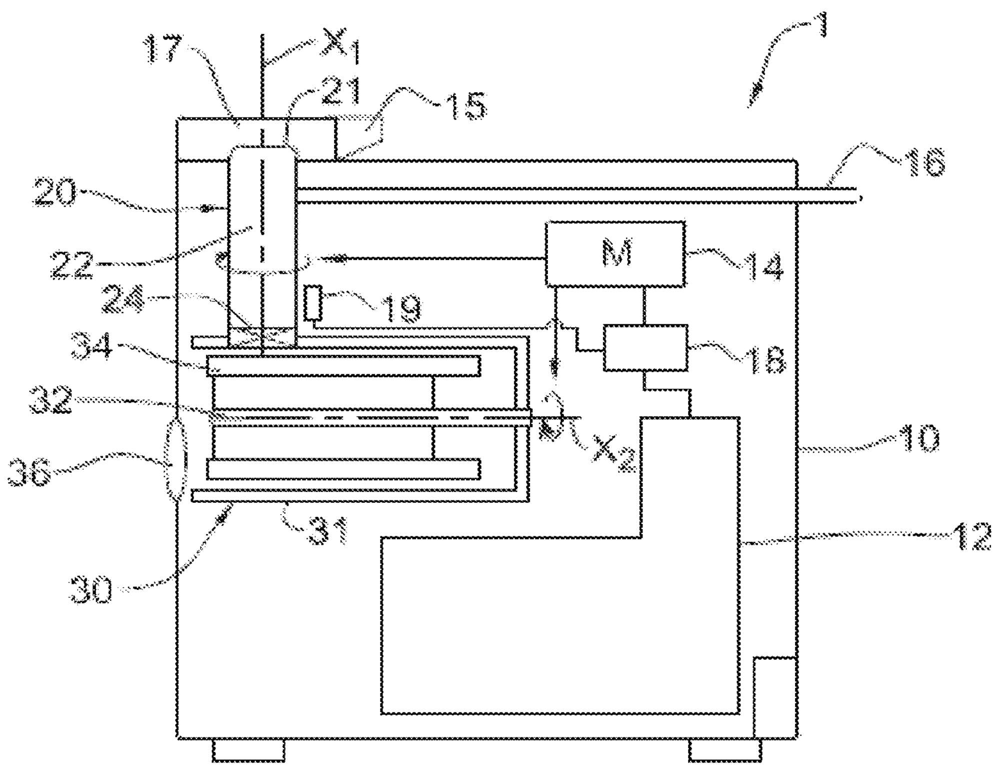

Attention is first drawn to FIG. 1, in which a system for the domestic preparation of a cooled edible product (e.g. ice cream) is shown, generally designated as 1. The system 1 comprises a housing 10, a mixing module 20, and cooling module 30, both modules 20, 30 being contained within the housing 10. The system 1 further comprises a pod 40 (shown in FIG. 3) containing at least one ingredient of the cooled edible product, the pod 40 configured for being received within the housing 10.

The housing 10 also comprises a cooling arrangement 12 configured for removing heat from the cooling module 30, and a drive motor 14 configured for driving ingredients of both the mixing module 20 and the cooling module 30. It is appreciated that individual motors can be provided for each of the mixing module, cooling module etc.

The housing 10 further comprises a cover 17 located over an inlet 21 of the mixing module, a user fluid inlet 15 and a built-in fluid inlet 16, both inlets 15, 16 leading to the mixing module 20.

Figure 2:
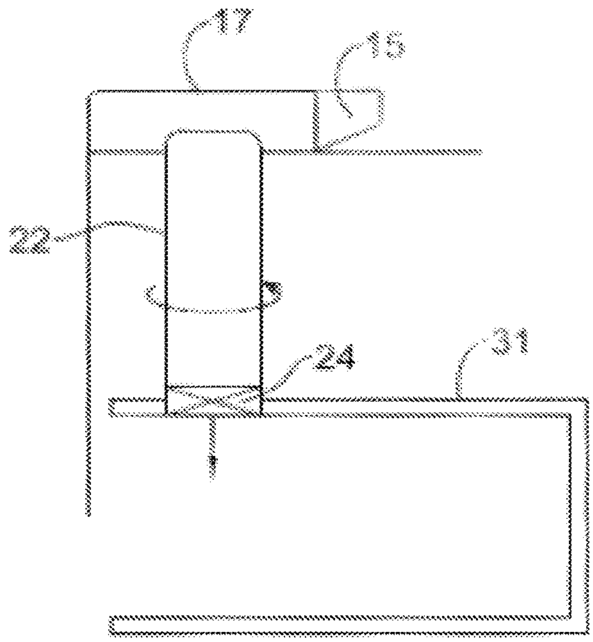

With additional reference being made to FIG. 2, the mixing module 20 is formed with a cavity 22 configured for receiving therein a pod 40 (shown in FIG. 3) via the inlet 21. The mixing module 20 further comprises a valve 24 configured for selectively allowing/preventing fluid communication between the mixing module 20 and the cooling module 30.

It is appreciated that the arrangement can be such that the pod 40 comprises the valve itself while the machine is formed with a corresponding engagement port configured for operating the valve.

The mixing module 20 also comprises a mixing arrangement (not shown) powered by the drive unit 14 and configured for revolving the pod 40 about a central axis $X_1$ thereof in order to allow mixing of the substance contained therein.

The cooling module comprises a chamber 31 having a main cavity fitted with a dasher having a central shaft 32 and mixing elements 34. The shaft 32 and mixing elements 34 are configured for revolving about the axis $X_2$ of the shaft in order to provide further mixing of the substance contained therein.

The chamber 31 is cooled by the cooling arrangement 12 so that the substance contained within the cooling module 30 and coming in contact with the wall of the chamber 31 is reduced in temperature. In this connection, it is important to note that the mixing element 34 are also configured for scraping off portions of the mixture which stick to the inner wall of the chamber 31, as they freeze.

The cooling module 30 also comprises an outlet port 36 configured for providing the cooled edible product to the user of the system 1.

The operation of the cooling arrangement 12 and the drive motor 14 is configured for being controlled by a controller 18. The controller can be further configured for receiving data signals from a transmit-unit 19 associated with the mixing module 20, and issuing corresponding commands to the cooling arrangement 12 and the drive motor 14.

Figure 3:
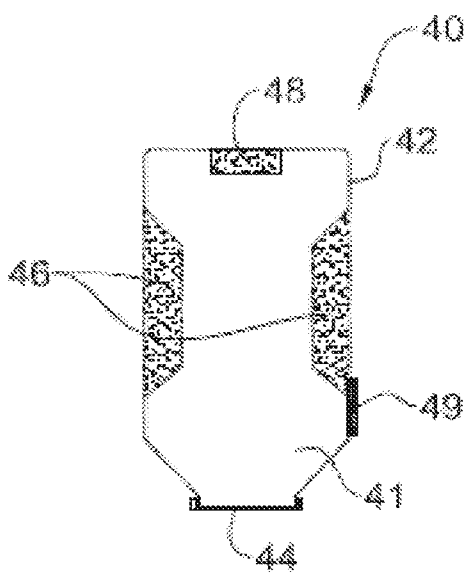

Turning now to FIG. 3, a basic design of a pod 40 is shown, comprising a body 42 with a central cavity 41, an outlet port 44 and inner side winglets 46 and top winglet 48, configured for mixing the ingredients contained within the pod 40.

In addition, the pod 40 comprises a data unit 49 which is configured for providing the system 1 with data regarding preparation parameters of the cooled edible product. The parameters in the data unit 49 are specific for the edible substance contained within the pod 40 and its state (solid, slurry, fluid etc.).

The data unit 49 is configured for communication with the transmit-unit 19 of the housing 10 in order to provide it with the necessary parameters which can then be transmitted to the controller 18.

Figure 5:
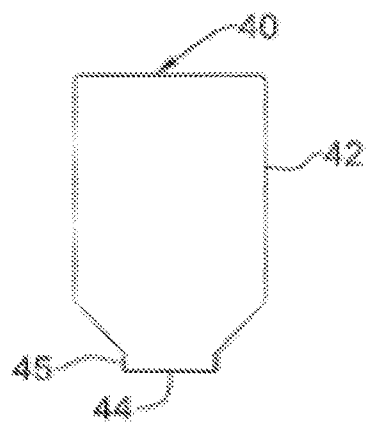

Reference is now made to FIG. 5, in which the outlet port 44 can be formed with a thread 45 configured for secure attachment of the pod 40 to the mixing chamber 20, which is, in turn, formed with a corresponding threaded portion.

With particular reference to FIG. 5, the pod 40 illustrates a “wet-pod”, i.e. a pod comprising an edible substance which is mixed with fluid, so that at least the majority (if not all) of the ingredients required for the preparation of the edible product are already contained within the pod 40. In this case, the pod can be inserted into the mixing module 20 and no additional fluid may be required for producing the cooled edible product.

Figure 4:
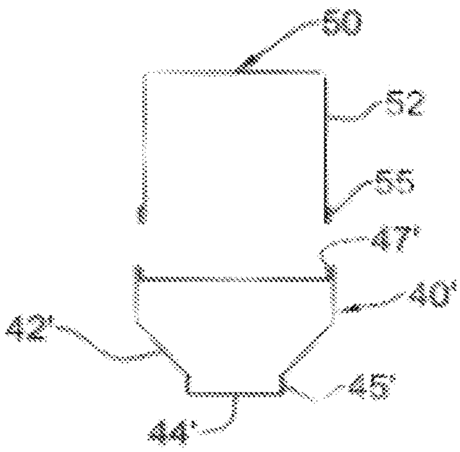

Alternatively, with reference to FIG. 4, the pod 40' can be a “dry-pod”, only containing some of the edible ingredients for the preparation of the edible product. In this case, the user can be provided with an additional member 50, configured for providing the “dry-pod” 40' with the required fluids for the preparation of the edible product. In particular, the user can fill the additional member 50 with a desired fluid of his/her choice and then attach the additional member 50 to the dry-pod 40', thereby forming a pod assembly similar to that of the pod 40.

The dry-pod 40' and the portion 50 can be configured for engagement with one another via a thread 47', 55, but it is appreciated that various means of connection therebetween can be provided, not limited to threading. In case of the dry-pod 40', the pod 40' resembles a capsule (similar to that which can be found in coffee machines).

Figure 6:
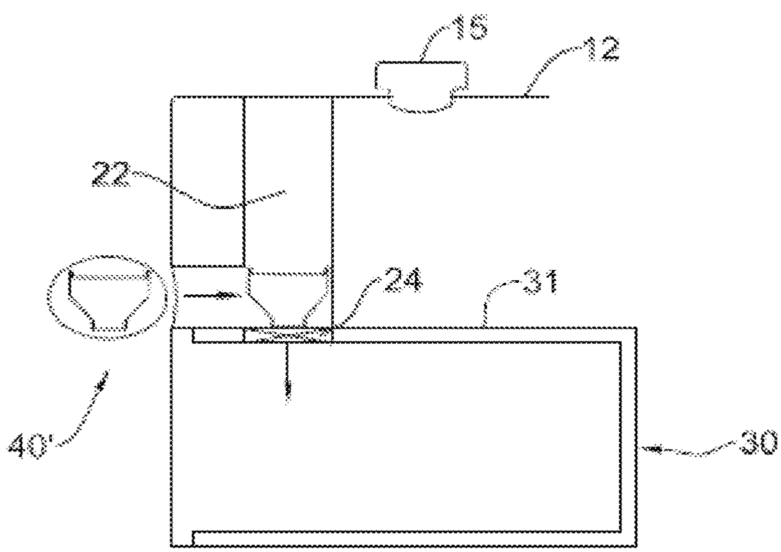
Figure 7:
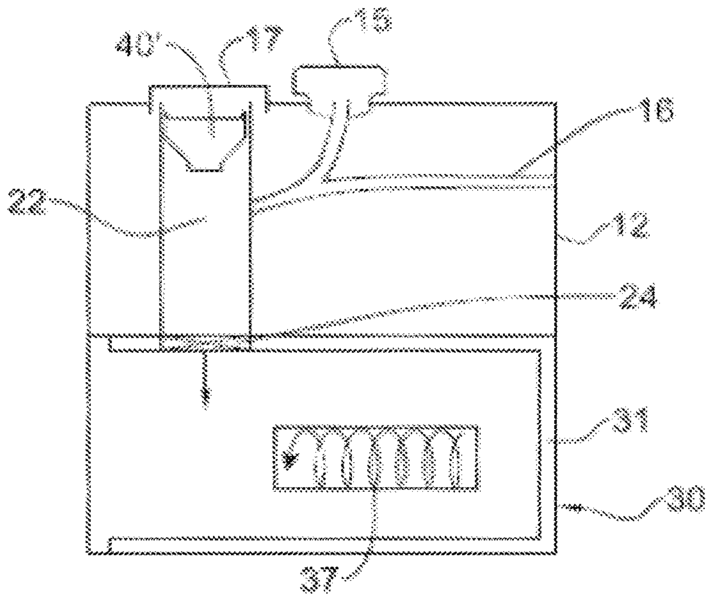

With reference to FIGS. 6 and 7, another embodiment of the machine is shown in which the dry-pod 40' is configured for insertion into the machine (without an additional member 50), similar to a pod for a coffee machine. In this case, the required fluids are provided directly into the mixing chamber 20 of the machine to be mixed with the substance of the dry-pod 40'.

In particular, FIGS. 6 and 7 demonstrate two configurations of insertion of the pod 40' into the machine, one from the side (FIG. 6) and one from the top (FIG. 7).

In both the wet-pod 40 and the dry-pod 40', the arrangement is such that the pod 40, 40' is configured for constituting a part of the mixing cavity 22.

In addition, regardless of which pod is used, fluid can be provided to the mixing cavity 22 either manually by the user via opening 15 or via a built-in inlet 16 which can be connected to the domestic water supply, bottle-port, etc.

In operation, the pod 40, 40' is first inserted into the mixing chamber 20. Once inserted, the data unit 49 provides the transmit unit 19 with the necessary preparation parameters which are then transmitted to the controller 18. Once the process parameters are acquired by the controller 18, preparation of the cooled edible product can commence.

The controller 18 first determines whether or not an additional fluid is required, and in the positive, either alerts the operator of the machine to add the fluid via the inlet 15 or automatically provides it via the inlet 16.

Once all the ingredients are contained within the mixing chamber 20, the drive unit 14, controlled by the controller 18, begins its operation and the edible ingredients are mixed together to form a mix. The mixing time, mixing rate etc. are all determined by the process parameters previously provided to the controller 18.

Once the ingredients are properly mixed within the mixing module 20, the controller 18 operates the valve 24 in order to allow the mix to flow into the mixing chamber 31 of the cooling arrangement 30.

The mix is then aerated and cooled to the necessary temperature (also determined based on the process parameters) and once it reaches a desired temperature/pressure/texture etc., the cooled edible product can be delivered to the user via the opening 36.

It is appreciated that for different types of ice cream, different process parameters are required in order to properly accentuate the flavors of that particular ice cream type, including texture, temperature sensation on the tongue and palate, stability of the ice cream before melting etc.

Several examples are provided below:

when making chocolate ice cream having a high sugar/dextrose level, it may be desired that the ingredients are cooled for a longer duration of time; The same may hold true for the preparation of a sorbet with an alcoholic substance; and when making a nut ice cream with a high fat percent, it may be desired to reduce the revolution speed of the dasher.

In addition:

A "wet-pod" will normally require a shorter/slower mixing process, then a "dry-pod" which content is mixed with additional materials.

A product based on a mix calculated for a low freezing point, may require a longer cooling process and or a higher level of temperature reduction.

A product based on a high level of solids, and planned for a low level of over-run, may require slower turning of the dasher and or a longer process.

Figure 8:
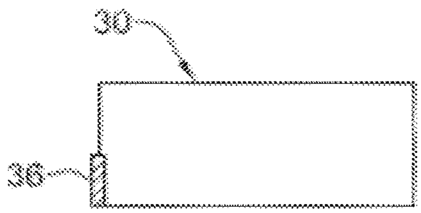
Figure 9:
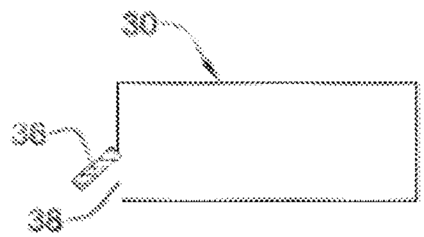
Figure 10:
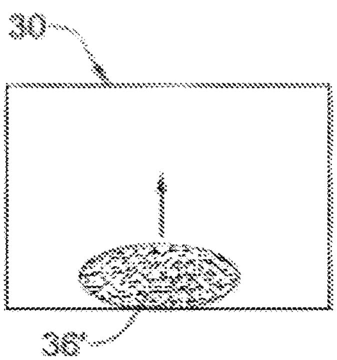
Figure 11:
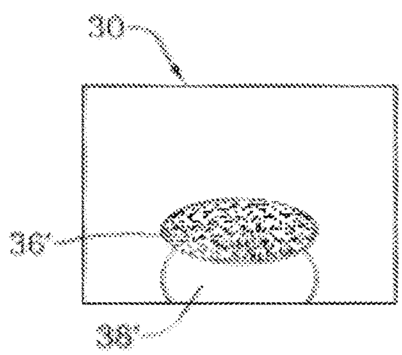

With reference being made to FIGS. 8 to 11, the opening 36 can be of various configurations, for example, in the case of FIGS. 8 and 9 to tilt about a pivot point and in case of FIGS. 10 and 11, to slide up and down.

It is noted that the cooling module 30 comprises a mixing arrangement (shaft 32 and elements 34) which is configured so as to propel the product towards the opening 36. So long as the opening is closed, pressure is applied to the edible product and, when a desired pressure is reached (also determined by the process parameters), the controller can signal the outlet 36 to open.

Figure 12:
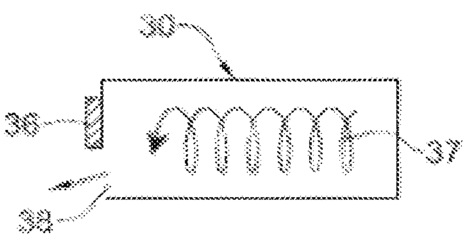
Figure 13:
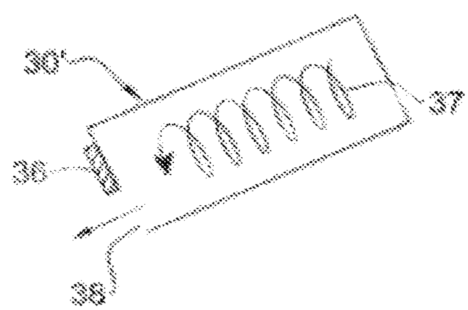

With reference to FIGS. 12 and 13, provision of the cooled edible product to the user can be made either solely by pressure applied on the product by the mixing shaft 32 and elements 34. In particular, the shaft 32 and elements 34 can be configured for propelling the edible product towards the opening as indicated by arrow 37. In addition, in case the chamber 31 is slightly tilted (FIG. 13) to use gravitational forces to let the product come out.

It may be desired to clean the system 1 and/or rinse it between preparations of different types of cooled edible products. For this purpose, there can be provided a cleaning pod (not shown) having a shape similar to that of the pod 40, 40', and containing a cleaning agent which is configured to flow through the system 1 (similar to the edible ingredients and product) when the pod is connected to the machine.

Figure 14A:
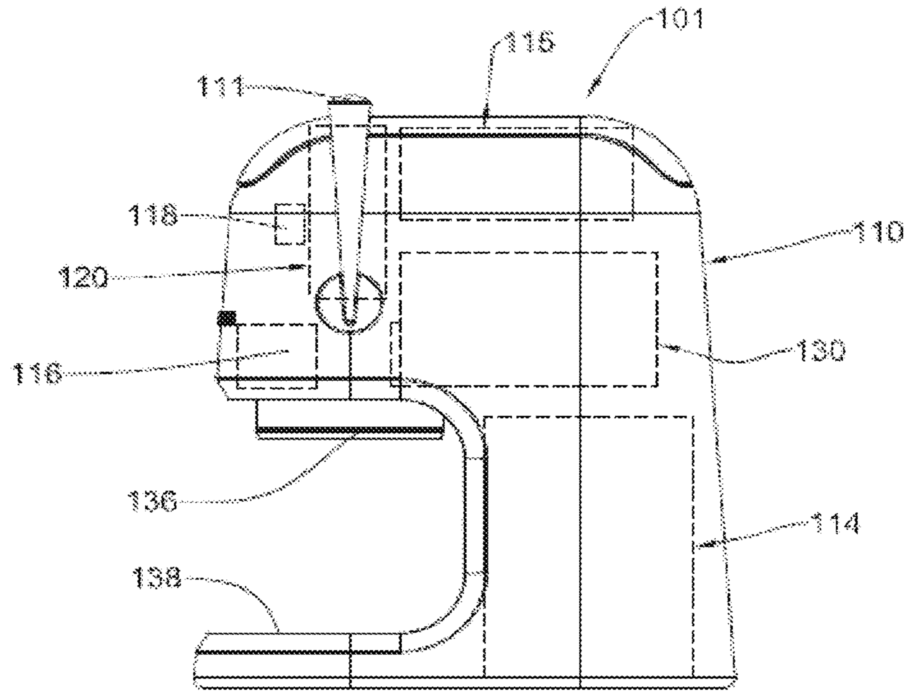
FIG. 14A is a schematic side view of a machine according to another example of said PCT application.
Figure 14B:
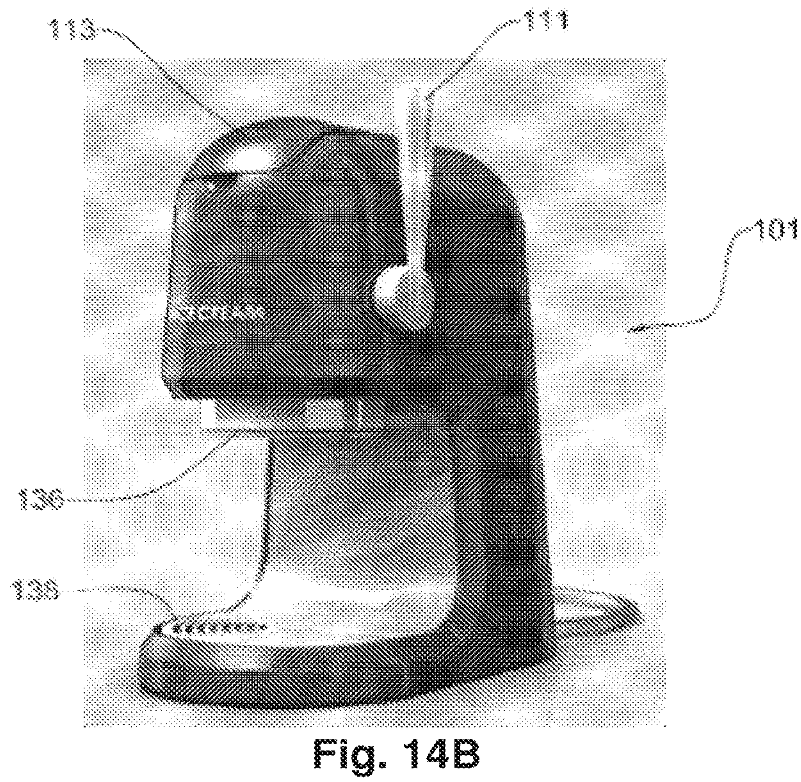
FIG. 14B is a schematic isometric view of the machine shown in FIG. 14A.

Turning now to FIGS. 14A and 14B, another design of a system for the preparation of a cooled edible product is shown, generally designated as 101, and comprising, similar to the previously described system 1, a main housing 110 accommodating therein a mixing chamber 120, a cooling chamber 130, a drive motor 115, a reader 118 and a controller 116.

The housing 110 is provided with a dispenser opening 136 configured for providing the cooled edible product (once prepared), a base 138 configured for positioning thereon a receptacle for receiving therein the cooled edible product dispensed from the opening 136 and a handle 111 for operating the system 101.

In operation, a receptacle portion 144 of a pod 140 (see FIGS. 15A, 15B) is provided through a top opening 113 of the housing into the mixing chamber 120 and positioned so as to be aligned with the position of the reader 118. The reader 118 is then configured for obtaining the required process parameters from the pod for the preparation of the cooled edible product, and provides the same to the controller 116.

Once all the required information is obtained by the controller 116, the latter can regulate operation of the mixing chamber 120, cooling chamber 130 and drive motor 115 for producing the edible product.

When the edible product is ready, the operator of the machine can be prompted by the system 101 (either by a visual or auditory aid) to operate the handle 111 of the system 101 in order to open the dispensing opening and allow the cooled edible product to be dispensed therefrom into a designated receptacle (not shown) placed on the base 138.

As appreciated from above, since the entire information regarding process parameters is provided by the pod itself, the entire system 101 can include a single handle (and possibly an on/off button) required for operating it, making the system 101 extremely simple and user friendly.

Figure 15A:
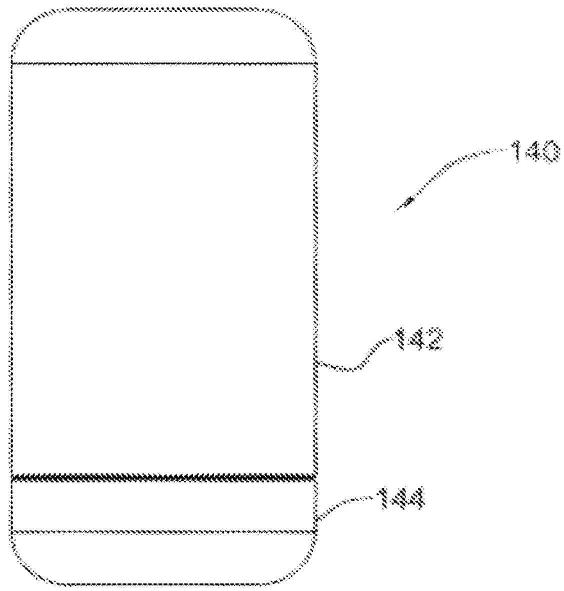
FIG. 15A is a schematic front view of a wet pod according to another example of said PCT application.
Figure 15B:
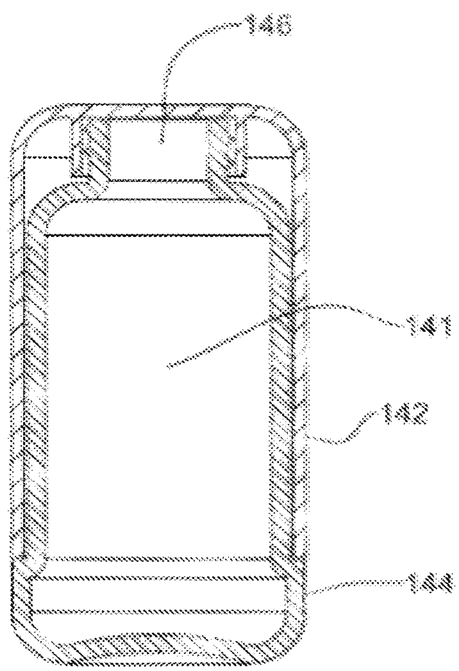
FIG. 15B is a schematic front view of the wet pod shown in FIG. 15A, including hidden lines.

Turning now to FIGS. 15A and 15B, a 'wet pod' is shown generally being designated as 140, and comprising a receptacle portion 144 and a cap 142. The receptacle portion 144 is formed with a cavity 141 configured for containing therein ingredients for the production of the cooled edible products and a mixing port 146 configured for operating in conjunction with the mixing chamber 120. The cap 142 is formed with a cavity configured for accommodating, almost fully, the receptacle portion 144.

It is appreciated that the term 'wet pod' refers to a receptacle which does not necessarily require the addition of a fluid to its contained ingredients in order to produce the cooled edible product. In other words, the wet pod can contain therein all the required ingredients for producing the cooled edible product, without requiring any additional ingredients.

In operation, the cap 142 of the pod can be removed before its insertion into the housing 110, and be placed on the base 138 to be used as the receptacle configured for receiving therein the cooled edible product. It is also appreciated that while the volume of the cap 142 is smaller than that of the receptacle portion 144, it is still appropriately sized for receiving therein the cooled edible product, similar to an ice cream cup/cone which normally accommodates a greater amount of ice cream than its volume.

Figure 16:
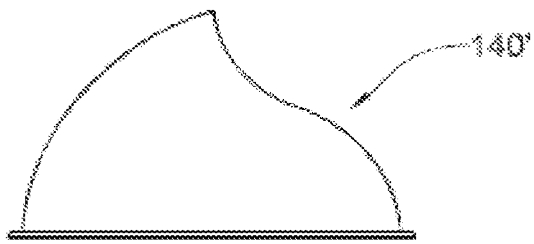

With reference to FIG. 16, another design of a 'dry pod' is shown, generally designated as 140, which is configured, contrary to the 'wet pod', for containing therein only some of the ingredients for the preparation of the cooled edible products, and required the addition of a fluid and/or further ingredients. On the other hand, the use of a 'dry pod' allows reducing the overall volume of the pod.

Attention is now turned to FIGS. 18A to 18D, in which another example of the machine is shown, generally being designated as 200. As in previous examples, the machine 200 includes a housing 210 accommodating therein a mixing chamber 220 configured for receiving therein a pod 240, 240' containing at least some ingredients for the preparation of the chilled edible product, a cooling chamber 230 for cooling the edible product/ingredients and a compressor 214.

The machine 200 is further provided with a dispensing opening 236 configured for dispensing of the chilled edible product to a user of the machine and a receptacle tray 238 for positioning thereon a receptacle for the chilled edible product. Control over dispensing is performed using a utility handle 211 articulated to the dispensing opening.

Figure 18A:
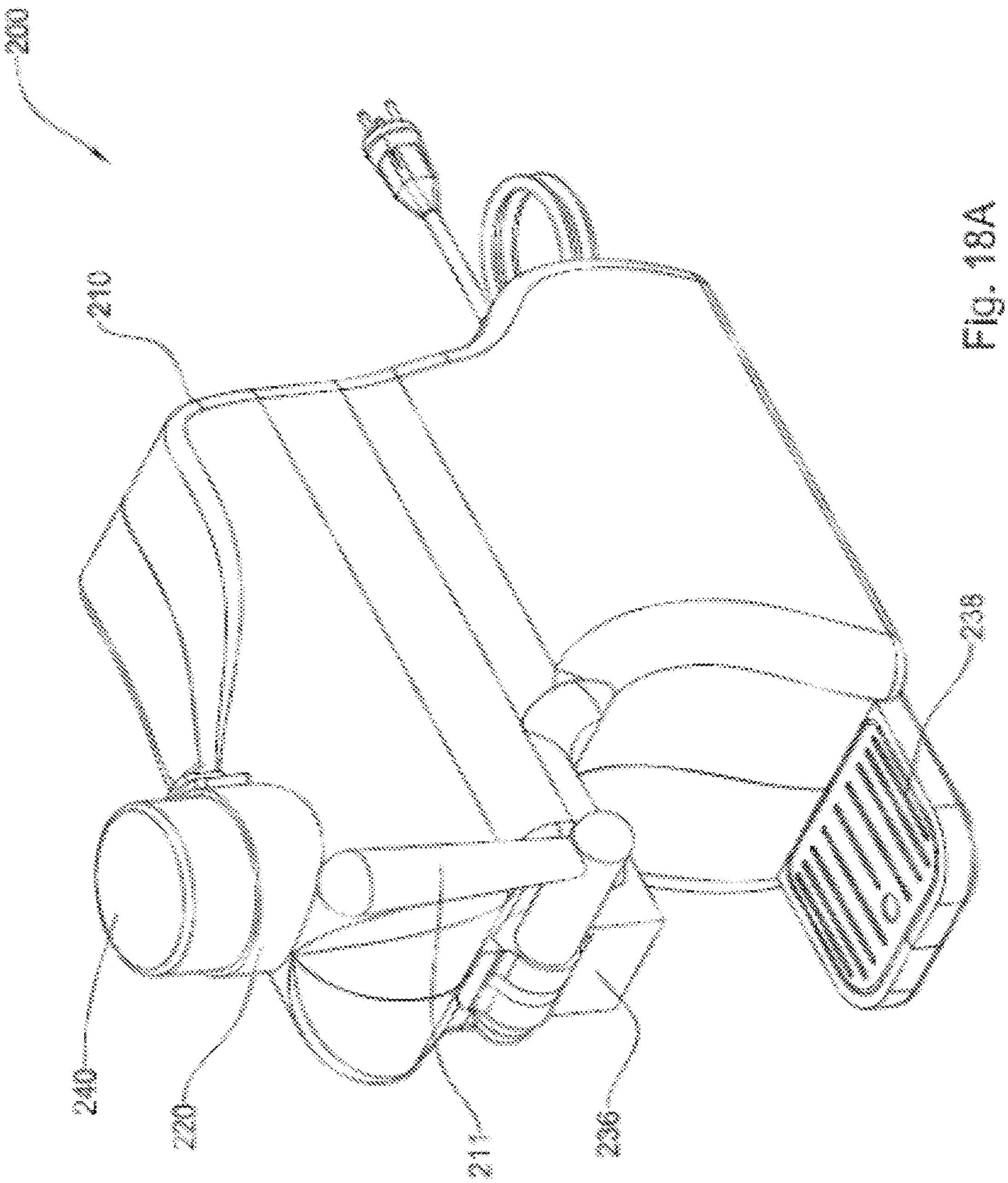
FIG. 18A is a schematic isometric view of one example of the machine according to said PCT application.
Figure 18B:
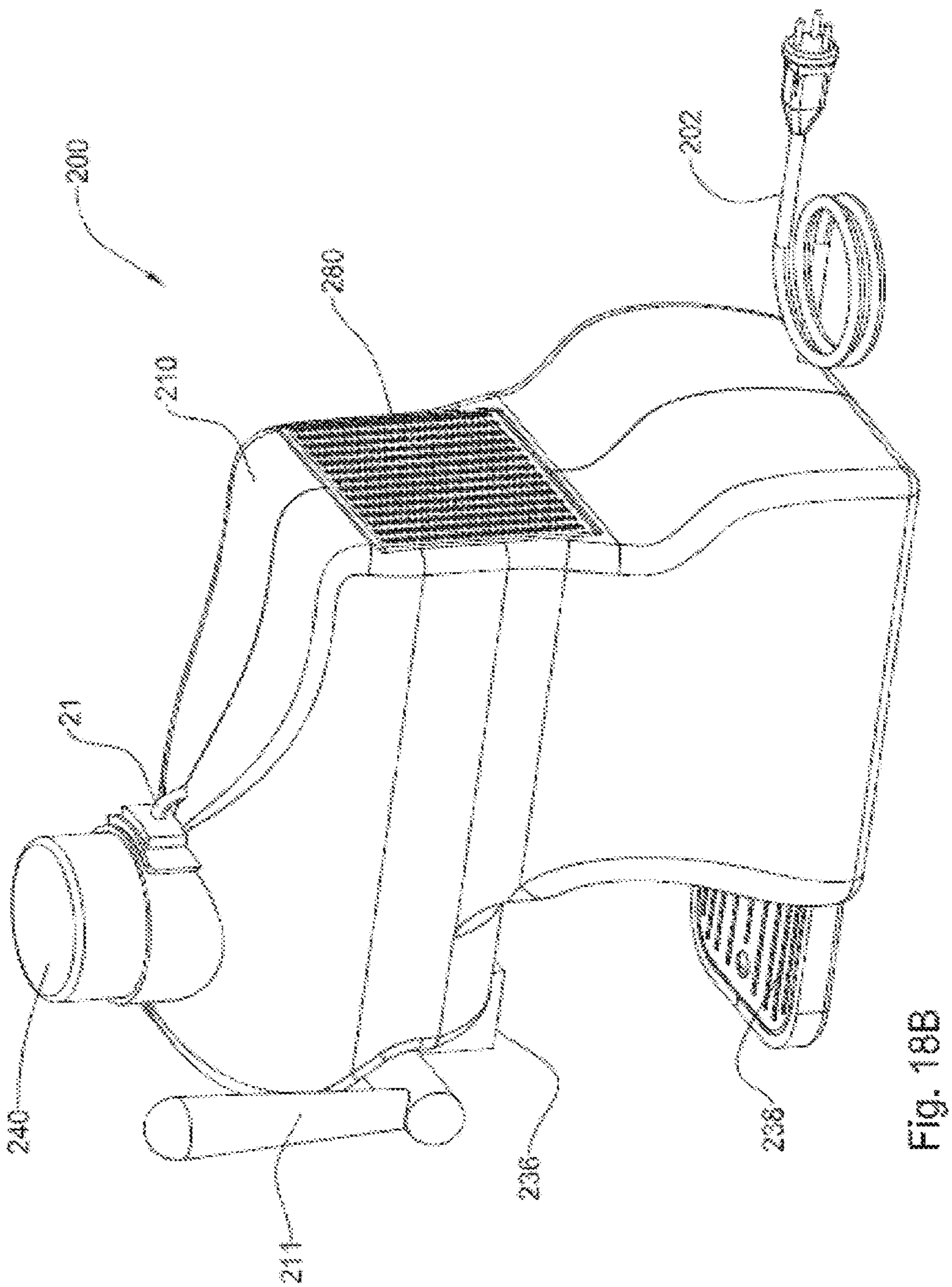
FIG. 18B is a schematic rear isometric view of the machine shown in FIG. 18A.
Figure 18C:
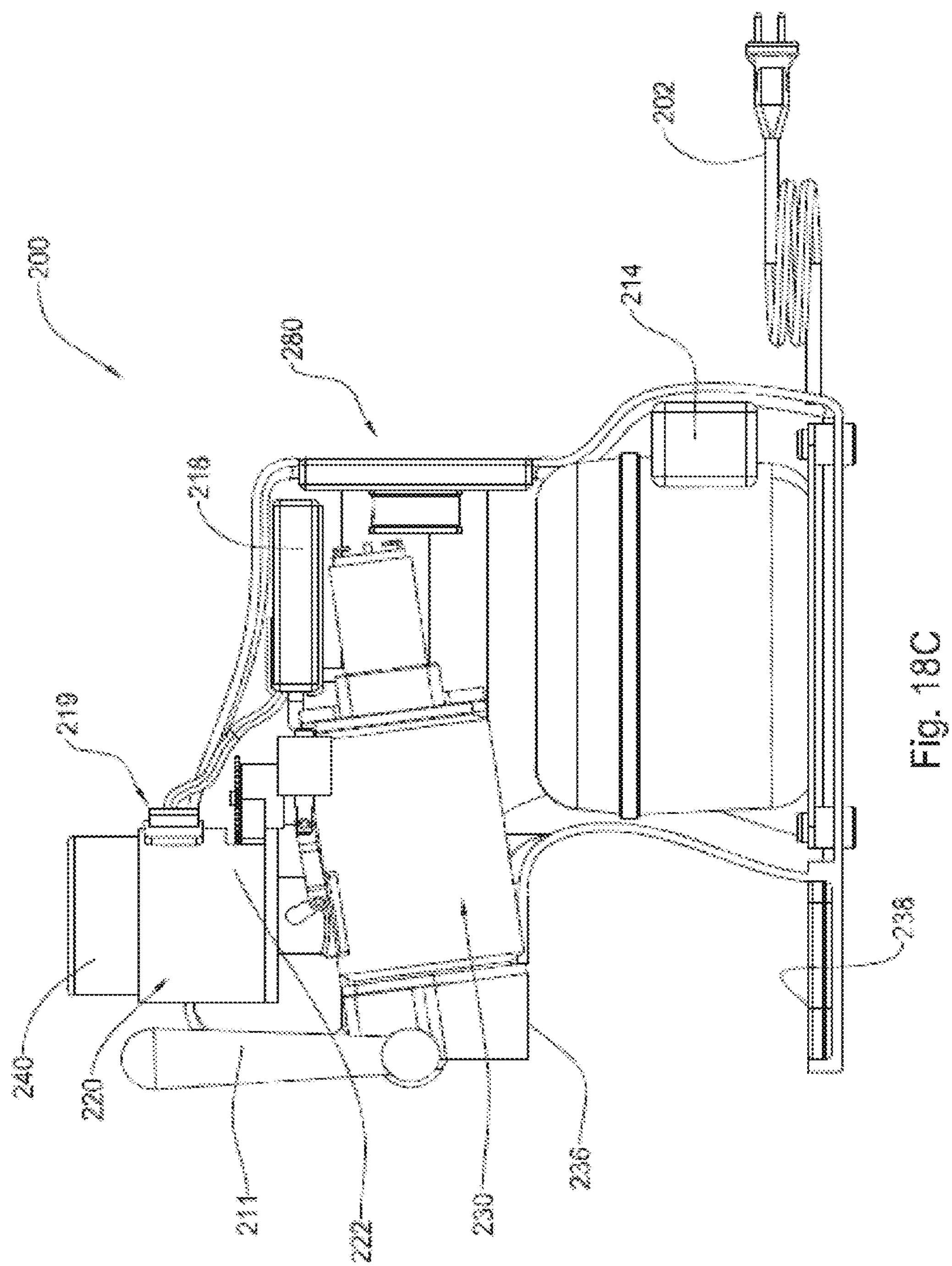
FIG. 18C is a longitudinal schematic cross-sectional view of the machine shown in FIG. 18A.

With particular reference to FIG. 18C, the mixing chamber 220 has a cavity 222 configured for receiving therein the pod 240 and is fitted with data reader 219 configured for receiving data from a data source 249 of the pod 240 and transmit the data to the control unit 218.

Figure 18D:
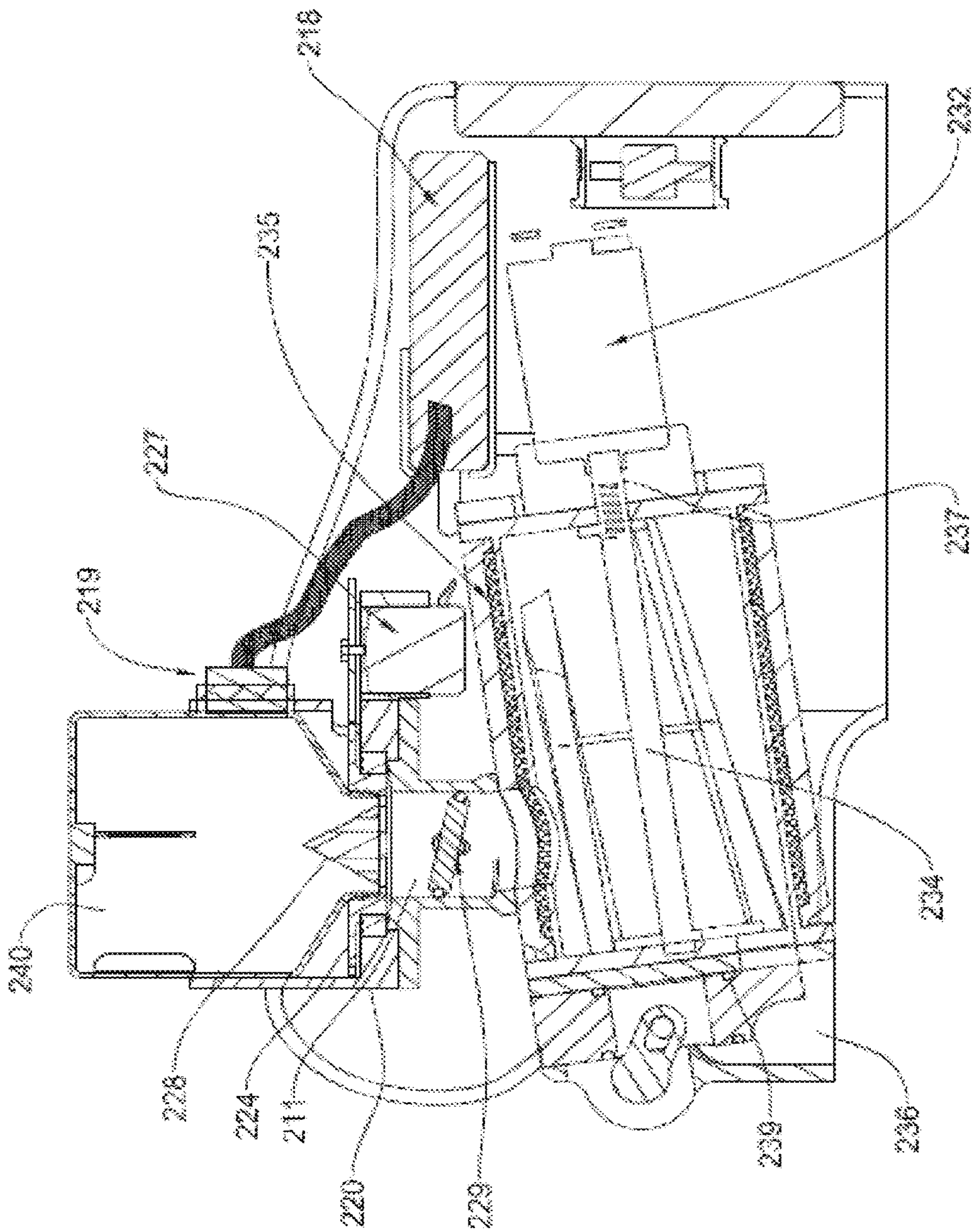
FIG. 18D is a schematic enlarged view of a portion of the cross-section shown in FIG. 18C.

Reference is now made to FIG. 18D in which a cross-section of the machine 200 is shown. It is observed that the mixing chamber 220 comprises at the bottom end thereof a piercing element 228 configured for puncturing a closure of the pod 240 when received within the mixing chamber 220 (see also FIGS. 19A to 20B), to allow extraction of the ingredients from the pod into the cooling chamber 230 after mixing takes place in the mixing chamber 220. For this purpose, the piercing element 228 is of a tapering shape ending with a tip sharp enough to pierce the closure.

The piercing element 228 is mounted on a rotor plate 224 configured for revolving the pod 240 and/or mixing the ingredients therein. It is also noted that the piercing element 228 is designed to be wide enough to assist in the mixing of the ingredients contained within the pod 240 during the mixing stage. Mixing is further facilitated by winglets 246 formed within the receptacle 240.

The passageway between the mixing chamber 220 and the cooling chamber 230 is provided with a valve 229 configured for regulating passage of mixed ingredients between the chambers 220, 230. The valve 229 is also associated with the controller 218 and the operation of which is regulated thereby.

As in previous examples, the cooling chamber 230 comprises a mixing motor and a mixing element 234, and is slightly inclined towards the outlet nozzle 236 so as to utilize gravitational forces in dispensing of the cooled edible product. In addition, the cooling chamber 230 is provided with a valve 239 configured for regulating dispensing of the cooled edible product therefrom. In particular, the valve can be configured for preventing emission of the cooled edible product from the cooling chamber 230 before it is fully ready.

Figure 19B:
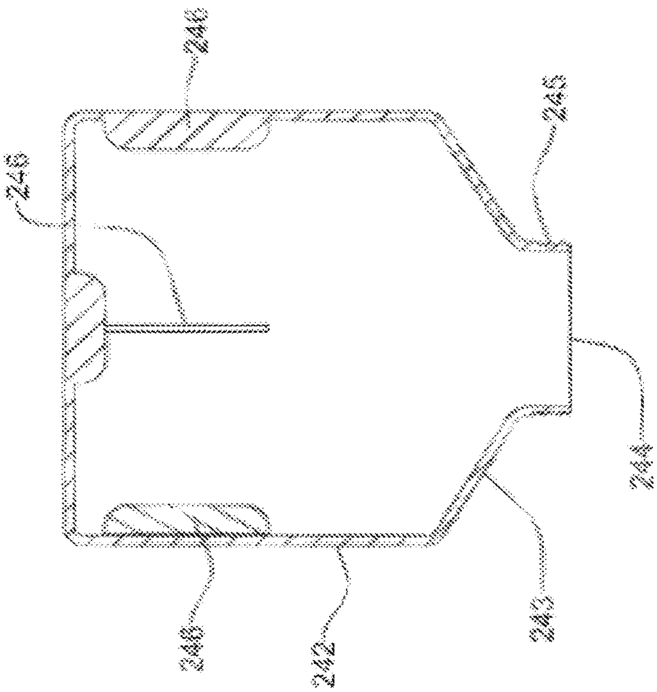
FIGS. 19A and 19B are schematic bottom isometric and cross-sectional views of a first example of a pod used in the machine shown in FIGS. 18A to 18D.
Figure 19A:
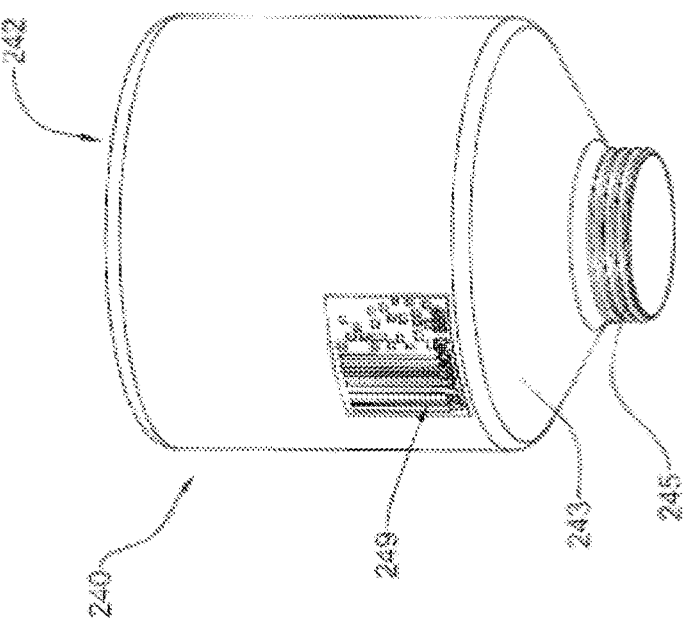

Turning now to FIGS. 19A and 19B, an integral pod 240 is shown being in the form of a receptacle 242 defining therein a cavity for containing the required ingredients for producing the cooled edible product.

The receptacle 242 is formed with a threaded attachment port 245 and has an opening sealed by a foil closure 244. When the pod 240 is received within the mixing chamber 220 of the machine 200 (see FIG. 18D), the piercing element 228 is configured for puncturing the foil, allowing the ingredients to be received within the mixing chamber 220.

It is appreciated that the mixing of the ingredients within the mixing chamber 220 actually takes place within the pod 240, as the pod is sized and shaped to be precisely received within the mixing chamber 220. It is noted here that the mixing chamber 220 is only configured, in the example, for operating in conjunction with a genuine pod 240 of the machine.

The pod 240 has fitted thereto and/or integrally formed therewith a data label 249 configured for communicating with the data reader 219 of the machine 200, for providing the controller 218 with the required information for producing the cooled edible products.

Figure 20B:
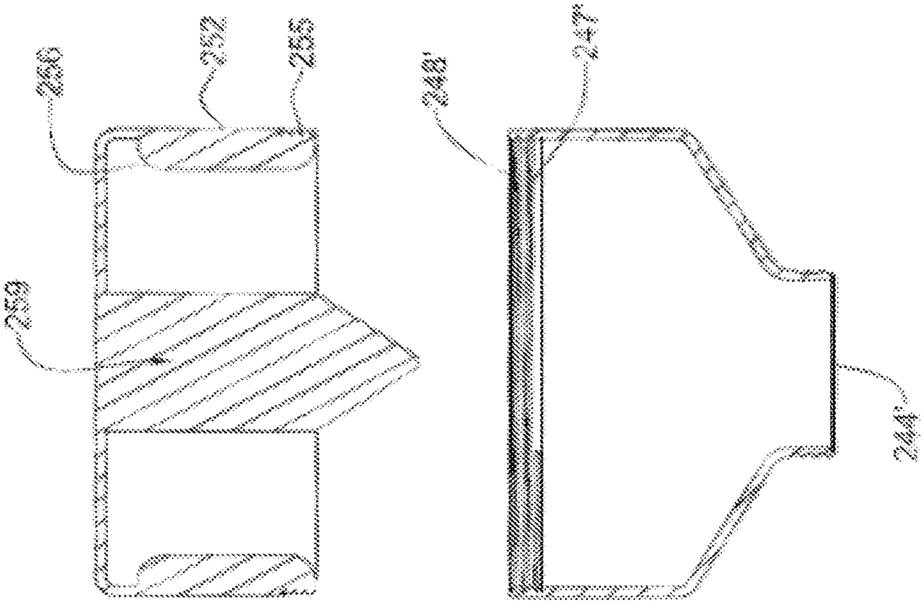
FIGS. 20A and 20B are schematic bottom isometric and cross-sectional views of a second example of a pod used in the machine shown in FIGS. 18A to 18D.
Figure 20A:
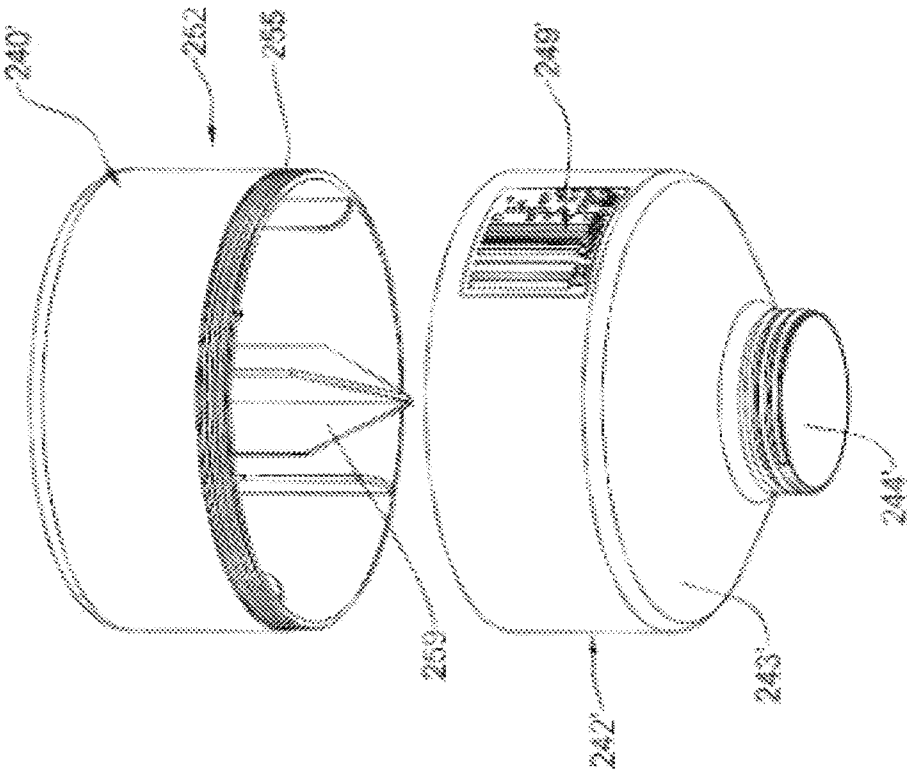

With attention being turned now to FIGS. 20A and 20B, a pod assembly 240' is shown comprising a first receptacle 242' and a second receptacle 252', being configured for attachment to one another. The receptacle 242' is essentially similar to the receptacle 242 with the difference being in the size (it is smaller) and in the amount and/or type of ingredients contained therein.

However, as opposed to the previously described pod 240, the receptacle 242' has a top foil closure 248' and an auxiliary attachment port 247' configured for attachment with a corresponding port 255 of the receptacle 252.

The receptacle 252 is an open receptacle and is configured for containing therein any desired liquid medium by choice of the user, which can be mixed with the ingredients of the receptacle 242' (e.g. juices, water etc.). The receptacle 252 is also formed with a piercing member 259 configured for puncturing the foil closure 248' of the receptacle 242' when the receptacles 242', 252 are properly attached to one another.

In assembly, the receptacle 252 can be an open end receptacle which can be filled with the desired liquid of choice and then the receptacle 242' can be mounted on the receptacle 252.

When attached, the receptacles 242', 252 form together a pod assembly which is very similar in shape and size to the original pod 240 and may thus function in the same way within the machine 200 and the mixing chamber 220, while providing the user with a greater variety of options and flavors.

Attention is now drawn to FIGS. 21A to 21E in which another example of the machine is shown, generally being designated as 200". As in the previous example, the machine 200" includes a housing 210" accommodating therein a mixing chamber 220" configured for receiving therein a capsule 240" (see FIG. 22) containing at least some ingredients for the preparation of the chilled edible product, a cooling chamber 230" for cooling the edible product/ingredients and a compressor 214".

However, as opposed to the previously described example, the machine 200" is configured for receiving therein a capsule 240" containing mostly 'dry' ingredients (solids, powders etc.) and the mixing chamber 220" is provided with a cover 217" configured for sealing the chamber 220" and a fluid inlet 215" leading thereto through the cover 217".

Figure 21A:
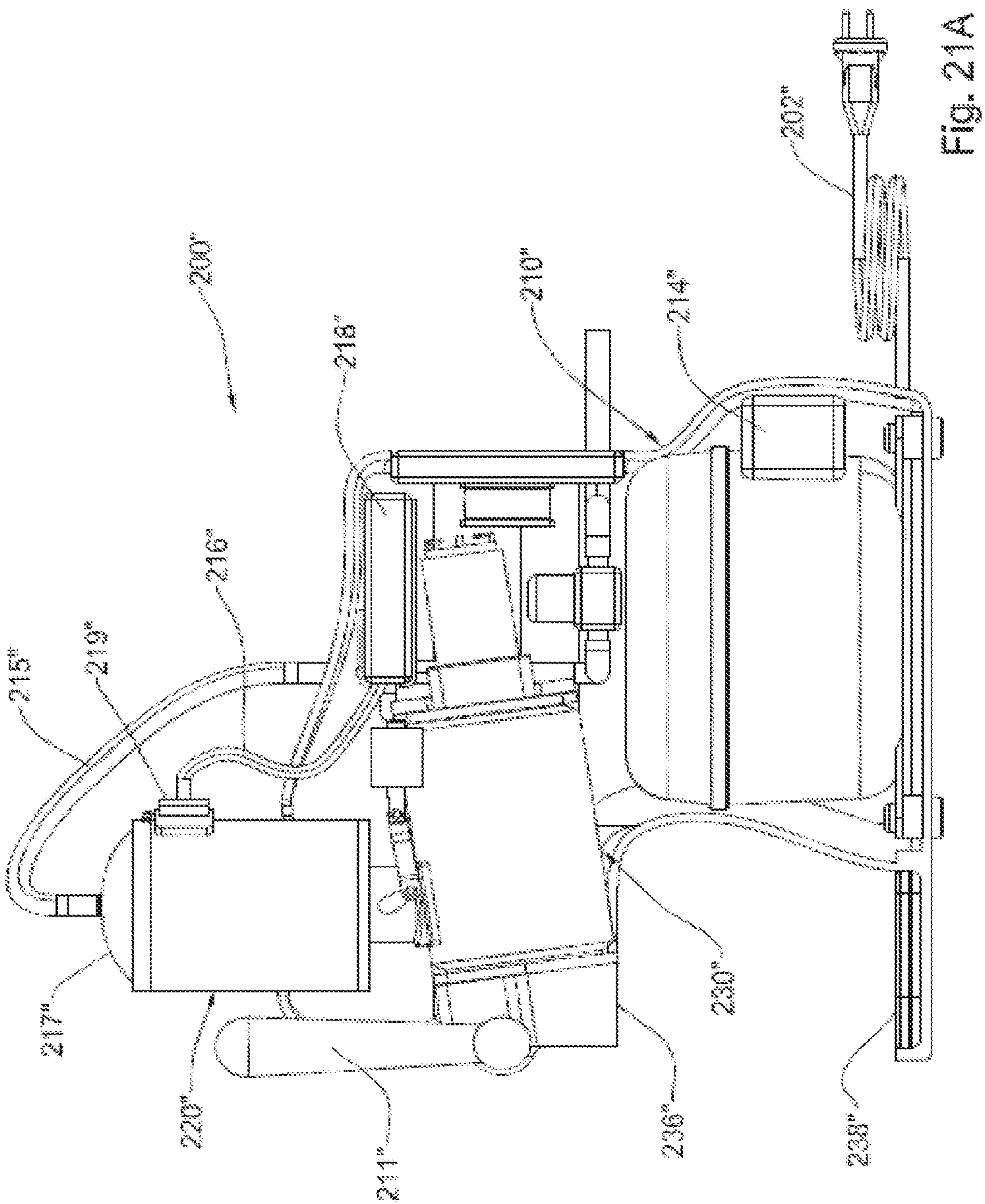
FIG. 21A is a schematic isometric view of another example of the machine according to said PCT application during a first position thereof, with a housing thereof being partially removed for illustration purposes.
Figure 21B:
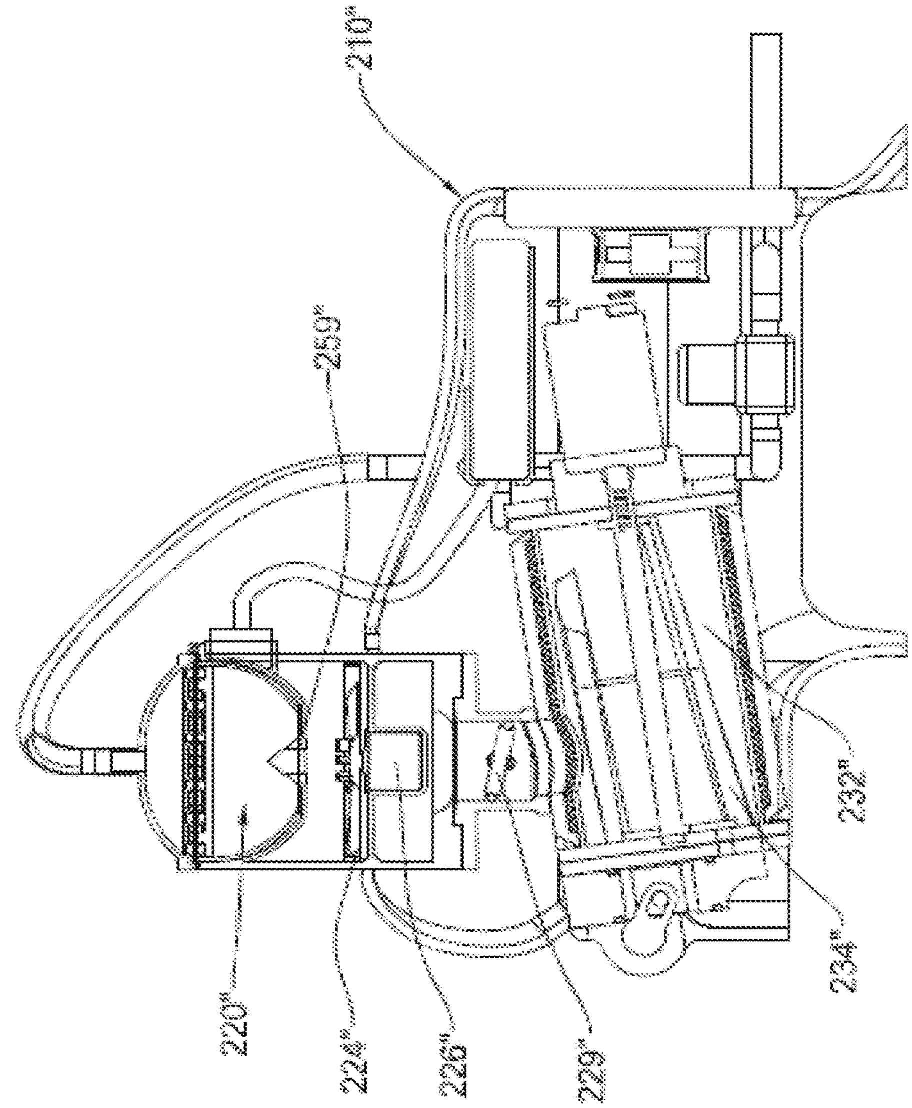
FIG. 21B is a longitudinal schematic cross-sectional view of the machine shown in FIG. 21A.
Figure 21C:
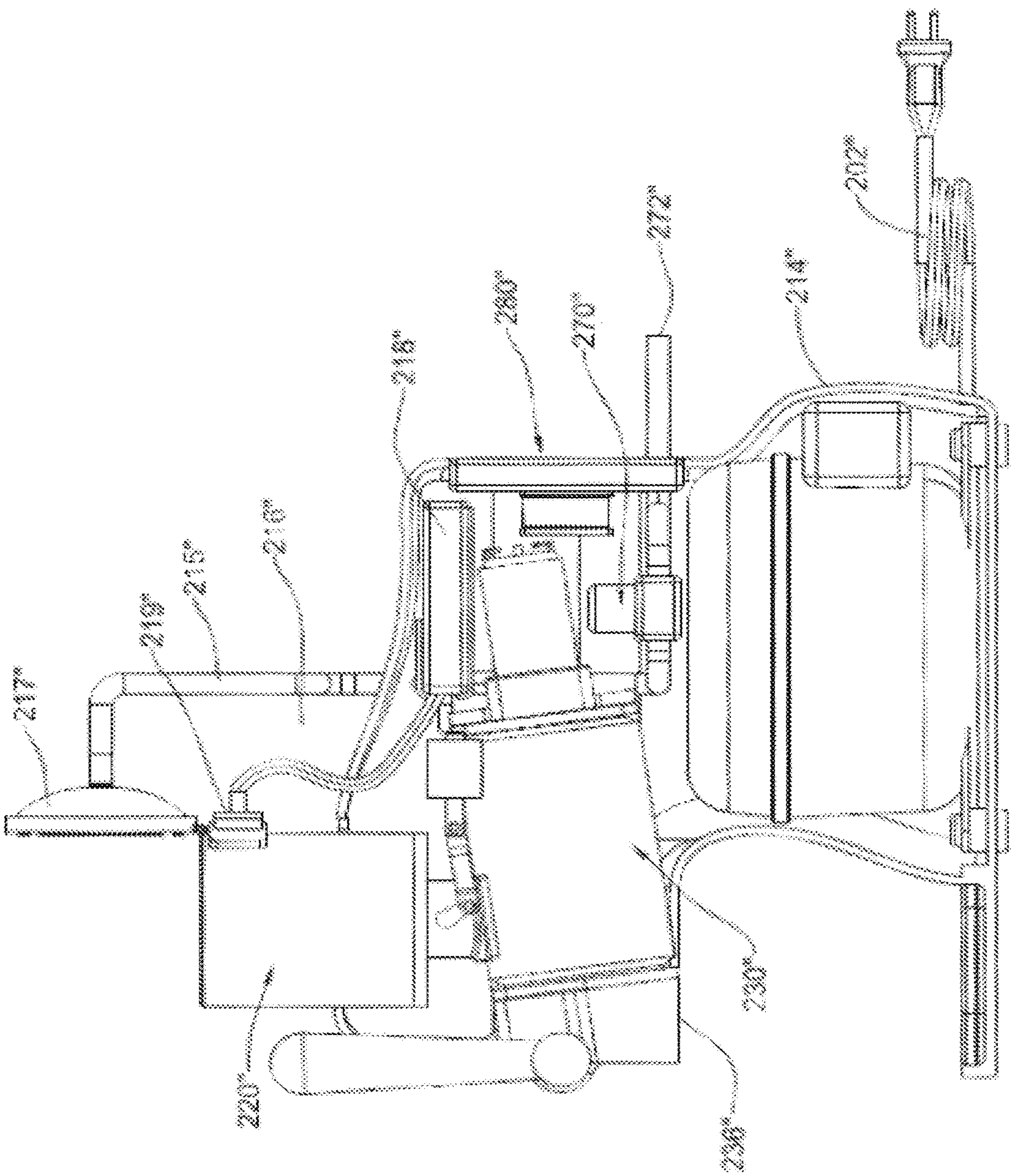
FIG. 21C is a schematic isometric view of the machine shown in FIG. 21A during a second position thereof, with a housing thereof being partially removed for illustration purposes.
Figure 21D:
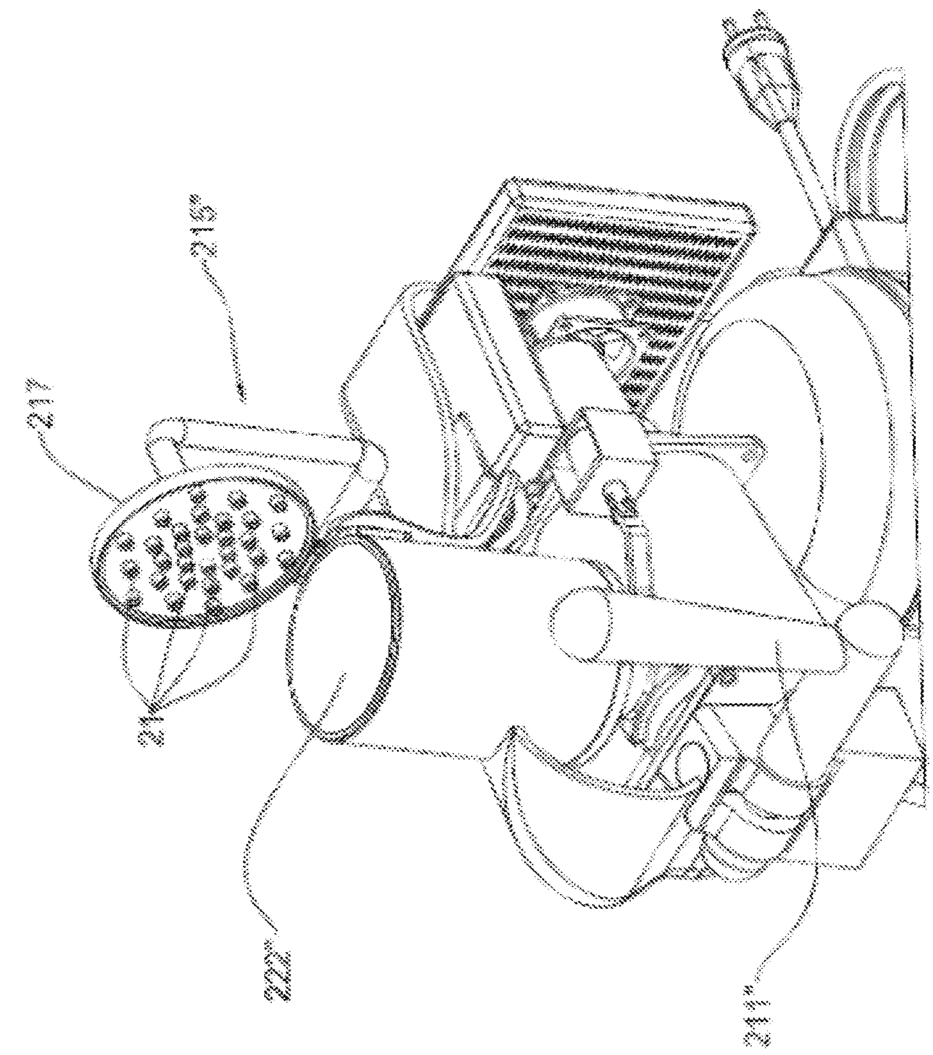
FIG. 21D is a schematic enlarged view of a portion of the machine shown in FIG. 21C.
Figure 21E:
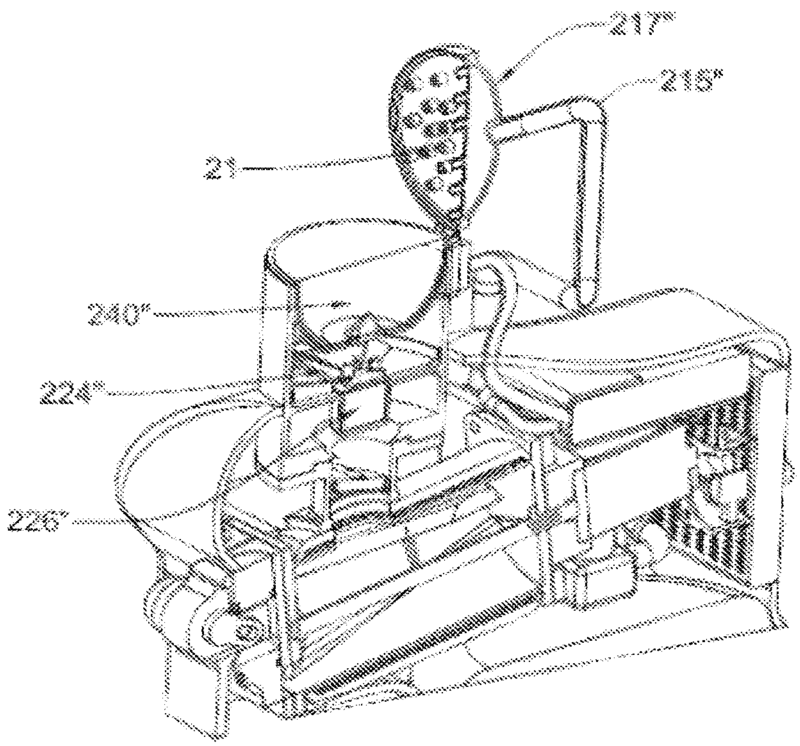
FIG. 21E is a schematic isometric cross-sectional view of the machine shown in FIG. 21D.

With particular attention being drawn to FIG. 21B, the capsule 240" is smaller than the mixing chamber and does not fill the entire cavity thereof (like the previously described pods 240, 240'). Instead, fluid is configured for being passed through the cover 217" and into the capsule, so that a mix of the external fluid and ingredients from the capsule 240" are provided into the mixing chamber 220" where they are then mixed.

In order to provide better diffusion and mixing of the external fluid with the ingredients within the pod, the cover 217" is provided with multiple fluid outlets leading into the capsule 240". The outlets are also designed to puncture a top foil closure of the capsule 240" once placed within the mixing chamber 220" and the cover 217" is properly closed.

Once the mix of external fluid and ingredients are provided into the mixing chamber 220", mixing takes place there and from then on the manufacture process is very similar to the previously described process of producing the cooled edible product. However, it is appreciated that during mixing, some of the ingredients may remain within the capsule and be mixed there as well, though, not as efficiently as within the mixing chamber.

Figure 17:
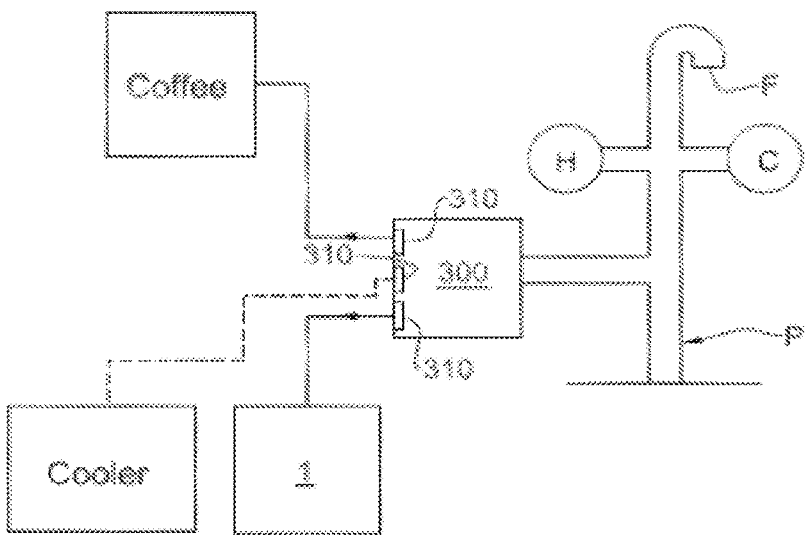
Figure 22:
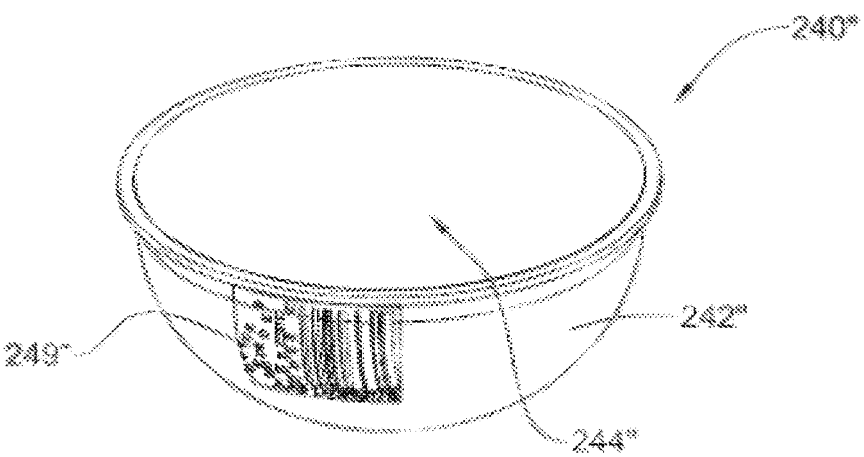

Attention is now drawn to FIG. 22, in which a capsule 240" is shown comprising a housing 242", a top foil closure 244", a bottom closure 243" (seen in FIG. 21B) and a data label 249". The capsule 240" is considerably smaller than the pods 240, 240' previously descried and is similar, in general, to coffee capsules. The capsule 240" is configured for being placed within the mixing chamber 220" so that the bottom foil closure 243" thereof is punctured by the piercing element 228 while the top foil cover thereof 244" is configured for being punctured by the outlets formed in the cover 217" when it is properly closed. Turning now to FIG. 17, a domestic water supply piping P is shown comprising a faucet F and a hot and cold regulation handles H and C respectively. According to the disclosed subject matter there is provided a water temperature regulation module 300 being in fluid communication with the piping P.

The module 300 comprises an inlet for receiving fluid from the main piping 1P, an heating/cooling unit (not shown) and a plurality of ports 310 configured for outputting the received fluid at a desired temperature.

The module 300 is configured for allowing a plurality of different kitchen appliances (e.g. coffee machine, cooler, the systems 1, 101 of the present application) to connect to the ports 310 and receiving from the module the fluid at a desired temperature.

At present, each of these kitchen appliances is provided with its own heating/cooling module and/or heating body etc. Employing the use of the temperature regulating module 300 allows eliminating the need for a corresponding module in each of the kitchen appliances. This may allow reducing the size and shape of each of these appliances.

The module 300 can also be provided with a controller (not shown) configured for regulating the temperature of the incoming fluid and controlling provision of the heated/cooled fluid to the relevant port.

It should be understood that the controller can also be configured for being in communication with each of the connected kitchen appliances, so that the user is not required to operate the module 300, but rather only the desired appliance.

Figure 23:
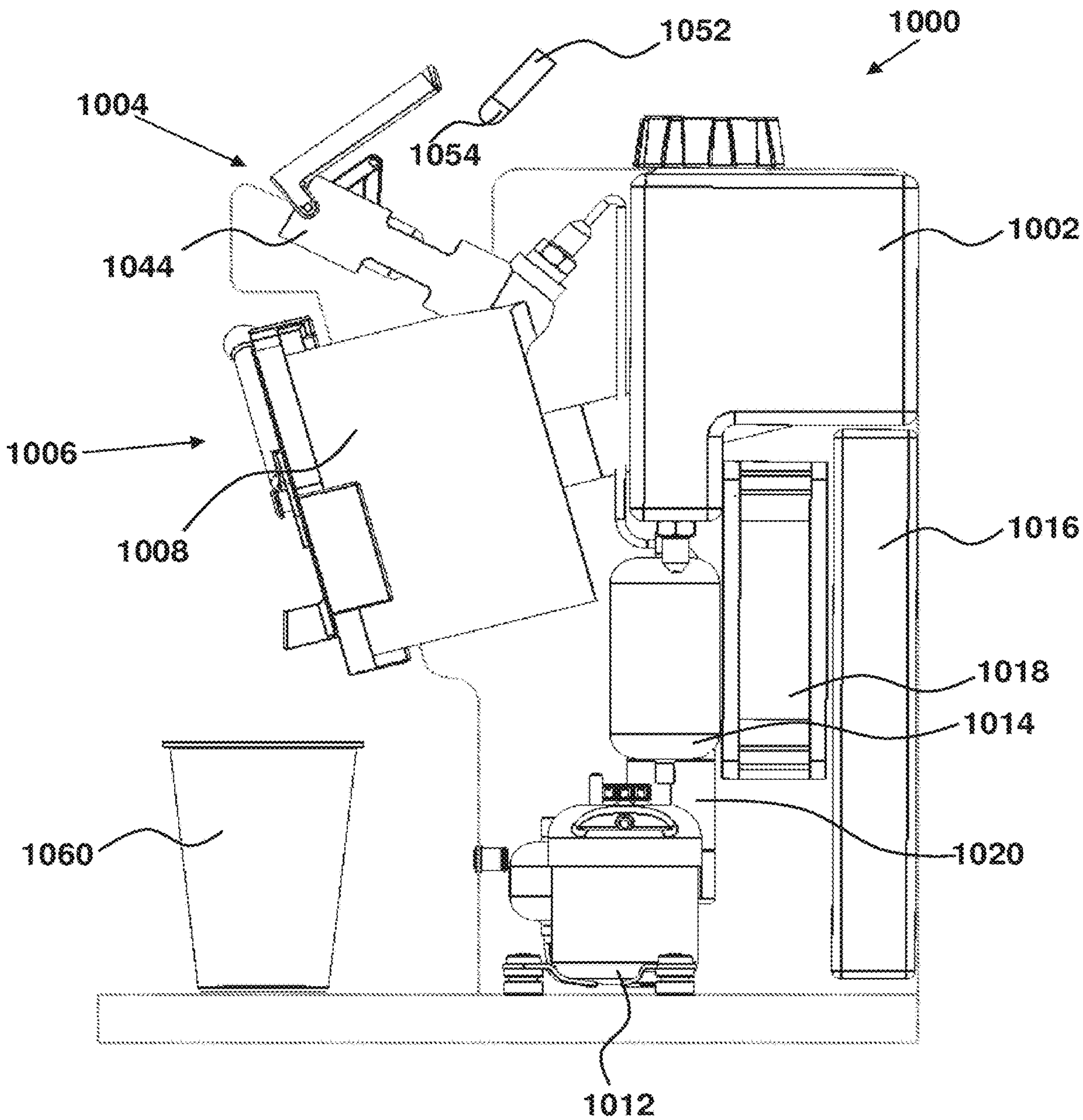
Figure 24:
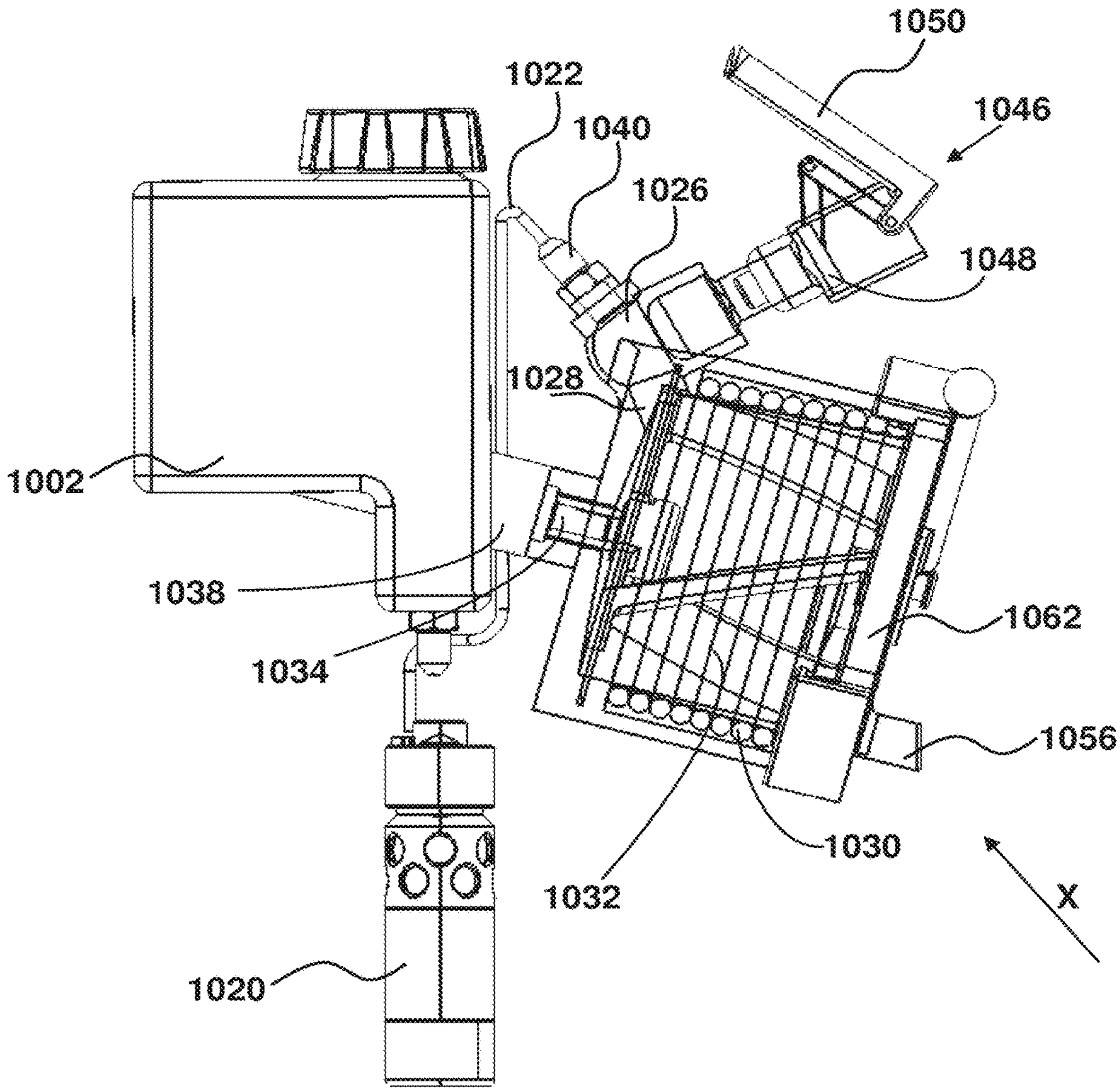

Embodiments of this disclosure Reference is now being made to FIGS. 23-24 showing internal elements of the machine generally designated 1000. Seen in this view is a liquid container 1002, the liquid being water, milk, cream, flavored water, etc. and, generally, in line with the intended finally formed edible food product and the underlying recipe, depending on the ingredients in the receptacle and process to be applied. Other elements that can be seen are adapter module 1004; processor 1006 with generally cylindrically shaped cooling chamber 1008 and an associated axial motor 1038 (rotating about the cylindrical axis 1034); and a refrigeration assembly that includes a compressor 1012, filter 1014, radiator 1016 with associated fan 1018. Operation of the refrigeration assembly is undoubtedly clear to a man of the art and will not be detailed herein.

The machine also includes a pump 1020 which, in this view (of FIG. 23), is hidden behind filter 1014 (but can be more clearly seen in FIGS. 24 and 28), which is configured for drawing liquid out of container 1002 and propelling it through tubing 1022 toward adapter module 1004.

Figure 25A:
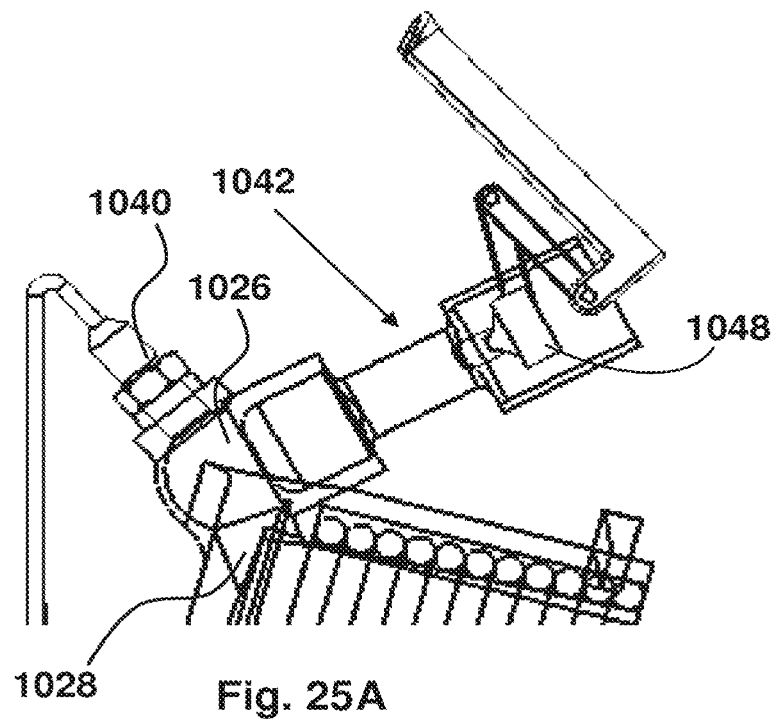
FIG. 25A is an enlarged view of the adapter module with the piston being in a retracted state.
Figure 25B:
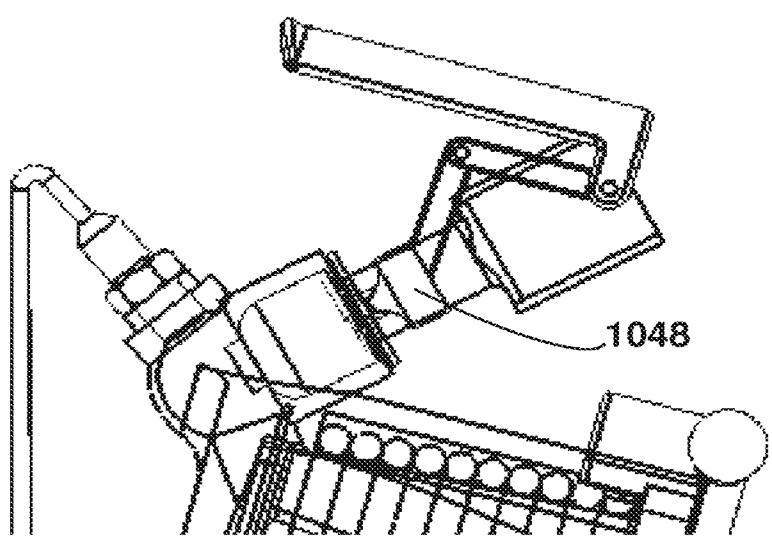
FIG. 25B is an enlarged view of the adapter module with the piston being in an extended state.
Figure 26:
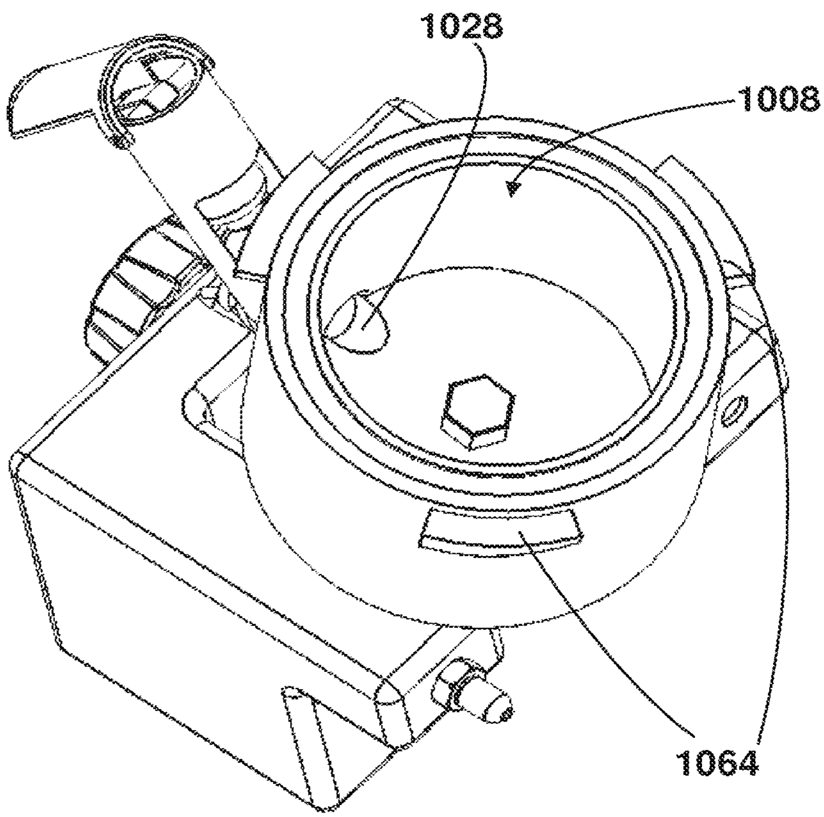

As can be seen in FIGS. 24 and 25A-25B, the adapter module includes a liquid conduit portion 1026 having an outlet 1028, linked to cooling chamber 1008 (as can best be seen in FIG. 26). As can be seen in FIG. 24, the cooling chamber is surrounded by cooling fluid coils 1030 which are in communication with and receive a cooling fluid from the refrigeration assembly (the manner of connection is not shown) and also includes within the chamber a dasher 1032 that has a rotation axis 1034 that is co-axial with the cylindrical axis of cooling chamber 1008, which is rotated by an axial motor unit 1038.

The adapter module, as can be seen in FIGS. 24 and 25A-25B, has in addition to liquid conduit portion 1026, that defines a chamber having a liquid inlet 1040 and an outlet 1028, a body 1042 configured for receiving (through side opening 1044) a receptacle that holds ingredients for preparation of the cooled edible product, which may be in the form of capsules, a pod, etc.

Included at the opposite end of adapter 1004 is a piston arrangement 1046 including piston 1048 that can reciprocate between a retracted state (as seen in FIG. 25A), in which the receptacle can be introduced into the adapter 1004 and an extended state (as seen in FIG. 25B) in which the receptacle is positioned with its opening being associated with the conduit portion 1026 to permit extraction of the contents of the receptacle into the conduit portion. For introduction of the receptacle, associated handle 1050 needs to be pulled backwards, whereby the piston 1048 retracts and clears the way for such introduction. In this embodiment, the operation of the piston 1048 is manual through use of handle 1050 but in other embodiments it may be electro-mechanical, hydraulic, pneumatic, etc.

The arrangement may be such that while the piston 1048 pushes the receptacle towards the conduit portion 1026, the opening of the receptacle is ruptured. By another embodiment, the receptacle may be made to be compressible and through compression by the piston, the contents of the receptacle are released into the conduit portion.

In operation, a receptacle is placed into the adapter 1004 and through movement of the piston 1048, the opening of the receptacle comes into association with the conduit portion 1026 and its contents are released there into. Liquid drawn by pump 1020, out of container 1002, is propelled through tubing 1022 into conduit portion 1026; and egresses out of outlet 1028 into cooling chamber 1008 of processor 1006. Motor 1038 is then activated to rotate dasher 1032. Through concomitant mixing and agitation by dasher 1032 and cooling of the ingredients with the liquid, a cooled edible product, e.g. soft ice cream, is produced.

The receptacle may carry data specific for process parameters to be applied in the preparation of a cooled edible product which is formatted for reading by a data reader utility. The data reader utility may be incorporated within the adapter module 1004 or may be an independent module, like module 1052 shown schematically in FIG. 23 and including a sensor portion 1054. e.g. an optical detector, RFID sensor, which is associated (in a manner not shown and known per se) with processor 1006 to control the process parameters applied by the processor, for example, the processing time, speed of rotation of the dasher, timing and time-dependent profile of a cooling temperature to be applied, etc.

Chamber 1008 has a general cylindrical shape and has an outlet 1056 with a valve (not shown), which may be automatically opened once the cooled edible product is ready. Alternatively, the chamber may be emptied via an outlet door which may be opened manually by the user once the preparation cycle of the cooled edible product has completed. The valve or outlet door may be prevented from opening during the preparation of the product. Upon completion of the processing, the valve is opened and dasher's rotation then functions to extract the cooled edible food product which is a liquid or in semi-solid form, out of outlet 1056 into a cup 1060 or alternatively into a cone or another collector.

Figure 27:
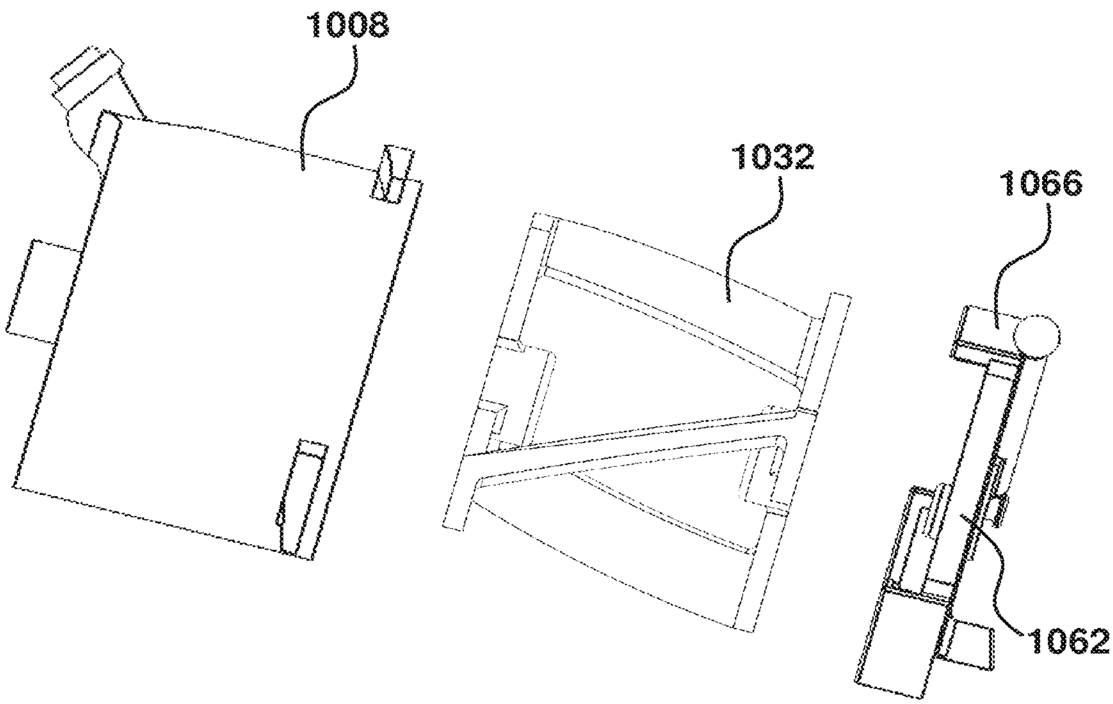

One of the bases of the cooling chamber is a detachable wall element 1062 that can be engaged and disengaged through rotation, the attachment being through engagement of lugs 1064 with corresponding skirt portions 1066 of the wall element 1062. Disengagement of the wall element 1062 permits, as can be seen in FIG. 27, removal of dasher 1032 and cleaning of the chamber's interior.

Figure 28:
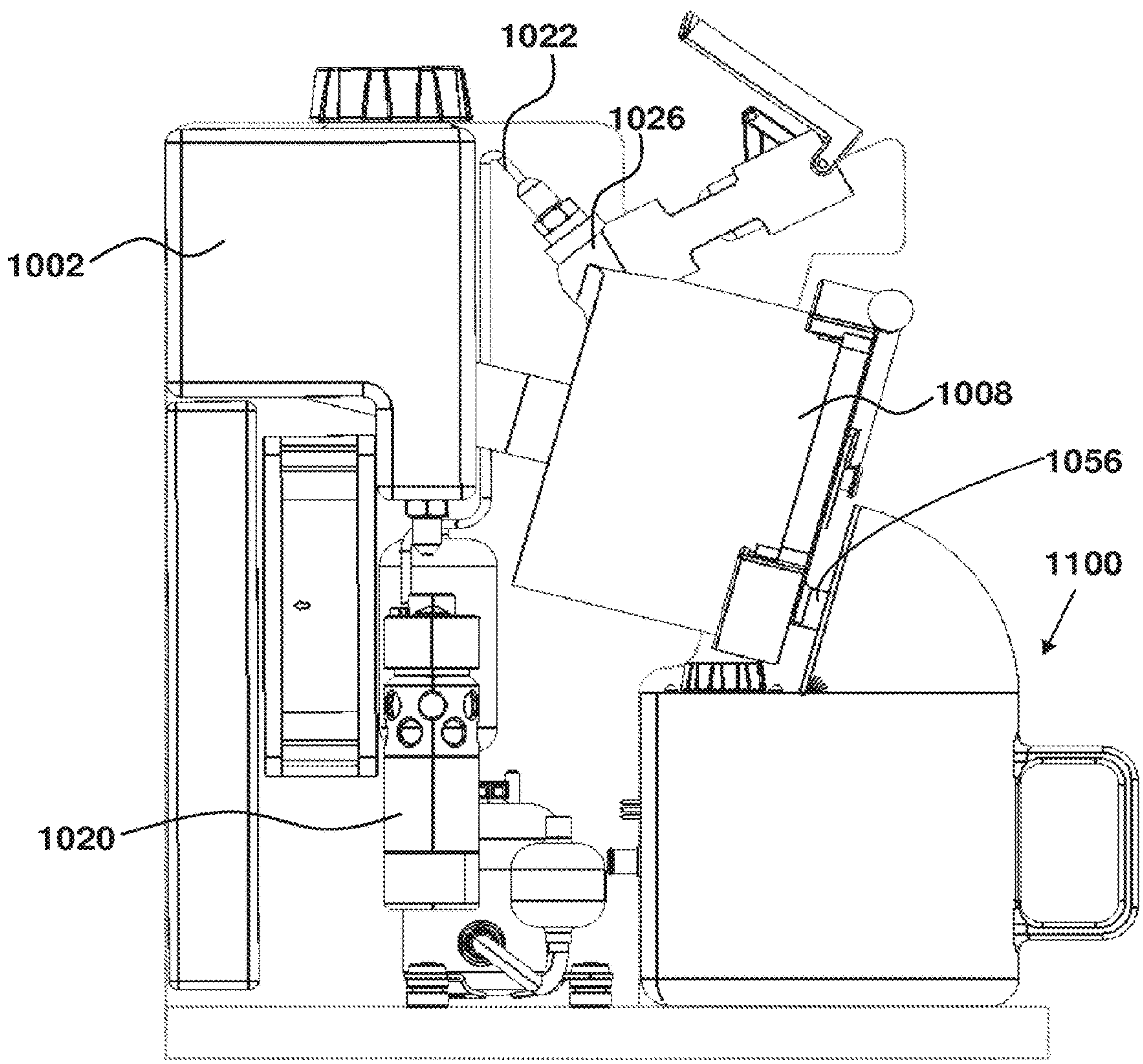
Figure 29:
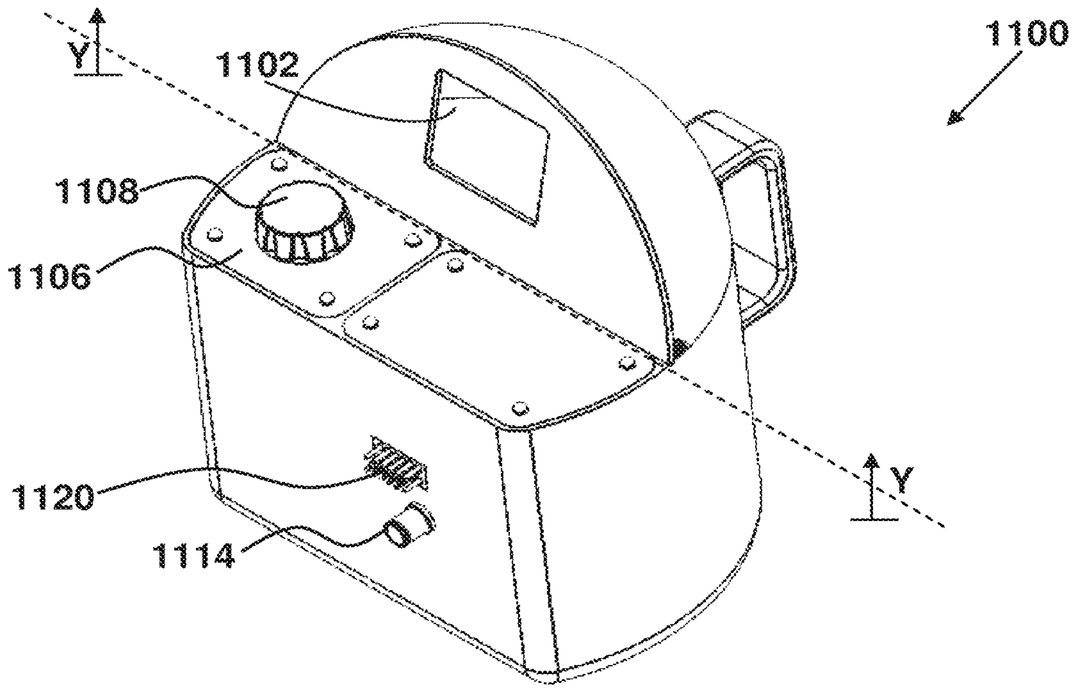
Figure 30:
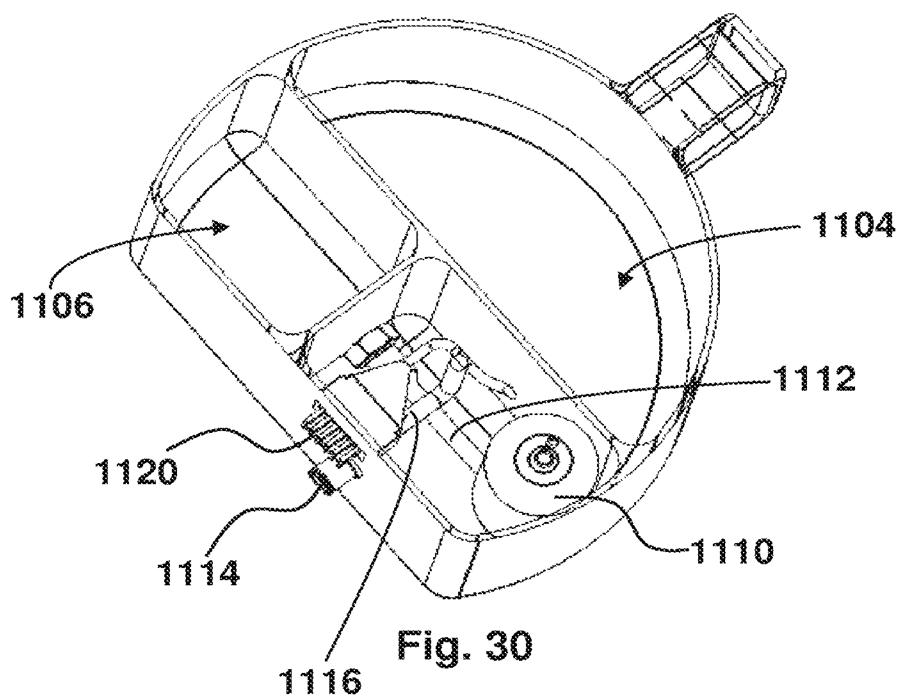

Reference is now being made to FIGS. 28 to 30 showing a removable rinsing utility 1100 (as shown in isolation in FIGS. 29 and 30). As can be seen in these Figures, a drainage liquid inlet 1102, opening into a drainage chamber 1104 has a rinsing liquid (e.g. detergent, disinfectant, etc) chamber 1106 with an opening that is sealed by lid 1108 and also includes a pump 1110, which may further function as a heating module, linked through pipe 1112 to the rinsing liquid chamber and is configured for pumping the detergent and propelling it out of detergent outlet 1114. Outlet 1114 is linked to tube 1116 which, in turn, is linked to pump 1110 (the connection seems broken in FIG. 30 because of the plane in which the cross-section was made).

Rinsing utility 1100 also includes an array of electrical pins 1120 electrically linked to electric/electronic elements in said utility that is positioned to permit its connection through a female connector in the machine (not shown).

In production operational mode, the machine is operated in a manner as described above. In the rinsing operational mode, the rinsing utility is brought into position in which it is associated with the processor through the machine's front, as shown in FIG. 28, in which outlet 1056 of cooling chamber 1008 fits into opening 1102. The array of electric pins 1120 is connected to the aforementioned female connector and outlet 1114 is fitted in a liquid-tight manner with a matching adapter of a conduit system configured for ducting the rinsing liquid through elements of the machine. The pump is then operated permitting the rinsing liquid to be drawn out of chamber 1106 and propelled through, for example, the pump, tubing 1022 and through conduit portion 1026 into chamber 1008. The dasher 1032 may be operated to assist in the rinsing of the cooling chamber. The rinsing liquid may be further diluted by liquid (e.g. water) included in container 1002. It is also possible, in a first stage, to propel only the rinsing liquid and then rinse it, in a second stage, with the liquid drawn out by pump 1020 from container 1002. The opening 1056 may be continuously or intermittently opened to release detergent and other rinsing liquids into chamber 1104 of the rinsing utility. At the end of this rinsing operation, the rinsing utility can be removed and the food product preparation may be resumed.

Removal of the rinsing utility permits emptying drainage chamber 1104 and replenishment of detergents in chamber 1106. In this embodiment, the rinsing utility is placed, when in the product preparation mode, in the same place as collector 1060 is placed in the product preparation mode (compare FIGS. 23 and 28). It should be noted that in other embodiments, the arrangement may be different and removal of rinsing utility from the machine may be from the side or from the rear of the machine, etc. Use of the rinsing utility may supplement cleaning of the cooling chamber by removal of lid 1062 through its opening, as described above.

By one example, the cooling chamber may first be cleaned by operating the machine in the rinsing operational mode for rinsing elements which are not accessible to the user, followed by opening of the cooling chamber for manual cleaning and inspection thereof.

The invention claimed is:

1. A system for the preparation of a cooled edible product from ingredients, said system comprising:

a processor comprising a cooling arrangement for processing the ingredients to produce the cooled edible product therefrom; and a removable rinsing utility configured for association with the processor, the removable rinsing utility comprises:

a rinsing liquid chamber with an opening that is sealed by a user-removable lid, the rinsing liquid chamber being associated with a pump, the pump being configured to draw the rinsing liquid and propel it out of a rinsing liquid outlet through a rinsing conduit system into the processor, and a drainage liquid inlet formed in a portion of the user-removable lid and opens into a drainage chamber, the drainage liquid inlet being configured to form liquid communication with a drainage outlet of the processor and configured for collecting liquid during a rinsing operational mode, the rinsing liquid chamber being integral with the drainage chamber along a common internal wall of the rinsing utility, and the rinsing utility further comprises a user-accessible handle formed on a side wall of the rinsing utility.

2. The system of claim 1, further configured to operate in a product preparation operational mode; the rinsing utility being configured for disassociation from the processor during the product preparation operational mode and for association with the processor in the rinsing operational mode.

3. The system of claim 1, wherein the drainage outlet of the processor is associated with the rinsing utility and configured to permit liquid egressing from the processor to drain directly into the drainage chamber.

4. The system of claim 3, wherein the drainage outlet fits into or is positioned above the inlet of the drainage chamber.

5. The system of claim 1, wherein the rinsing utility further comprises a heating module for heating the rinsing liquid.

6. The system of claim 1, wherein the rinsing utility further comprises an electric connector, configured to be selectively electrically connectable to the system.

7. A machine for the preparation of a cooled edible product from ingredients, said machine operative in a product preparation operational mode and a rinsing operational mode and comprising a processor configured to couple to a pod that holds at least some of the ingredients for the preparation of a single serving of said cooled edible product from said ingredients, the processor configured to receive at least a majority of the ingredients held by the pod and operative in the product preparation operational mode for processing the ingredients to produce said single serving of the cooled edible product therefrom;

a dispensing outlet for dispensing the formed cooled edible product from said processor; and a removable rinsing utility configured for detachable association with the processor, comprising:

a rinsing liquid chamber with an opening that is sealed by a user-removable lid, the rinsing liquid chamber being associated with a pump, the pump being configured to draw the rinsing liquid and propel it out of a rinsing liquid outlet through a rinsing conduit system into the processor, and a drainage liquid inlet formed in a portion of the user-removable lid and opens into a drainage chamber, the drainage liquid inlet being configured to form liquid communication with a drainage outlet of the processor, and configured for collecting liquid during the rinsing operational mode, the rinsing liquid chamber being integral with the drainage chamber along a common internal wall of the rinsing utility, and the rinsing utility further comprises a user-accessible handle formed on a side wall of the rinsing utility.

8. The machine of claim 7, wherein the rinsing utility is configured for disassociation from the machine during the product preparation operational mode, and for association with the machine in the rinsing operational mode.

9. The machine of claim 7, wherein the drainage outlet of the processor is associated with the rinsing utility and configured to permit liquid egressing from the processor to drain directly into the drainage chamber.

10. The machine of claim 9, wherein the drainage outlet fits into or is positioned above the inlet of the drainage chamber.

11. The machine of claim 7, wherein the machine has a front wall facing a user and the rinsing utility is associated with the machine through the front wall.

12. The machine of claim 7, wherein the rinsing utility further comprises a heating module for heating the rinsing liquid.

13. The machine of claim 7, wherein the rinsing utility further comprises an electric connector, is-configured to be selectively electrically connectable to the machine.

* * * * *